Figure 1:
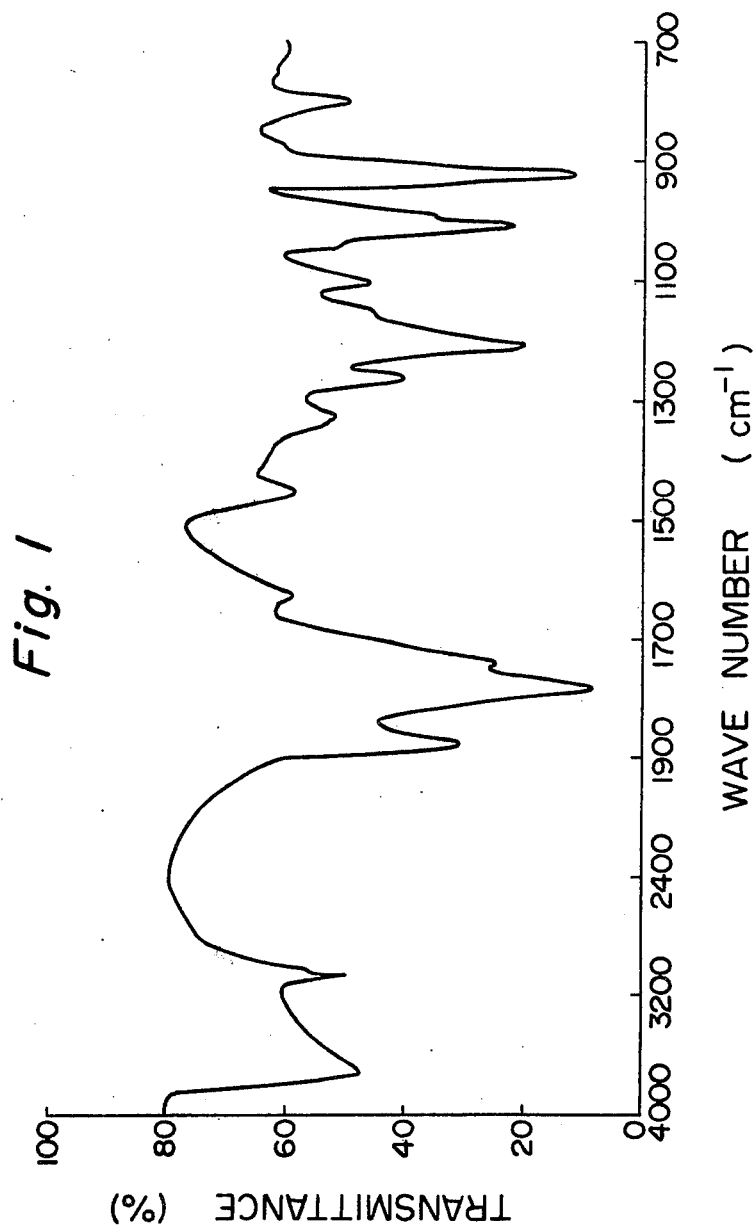

United States Patent [19]

Kurosawa et al.

[11] 4,022,954

[45] May 10, 1977

[54] NOVEL POLYMER CONTAINING CYCLOPENTANYLVINYLENE UNITS

[75] Inventors: Shigeru Kurosawa; Takashi Ueshima, both of Yokohama; Yasuzi Tanaka, Kawasaki; Shoichi Kobayashi, Yokohama, all of Japan

[73] Assignee: Showa Denko Kabushiki Kaisha, Japan

[22] Filed: July 1, 1975

[21] Appl. No.: 592,320

[30] Foreign Application Priority Data

July 4, 1974 Japan .............................. 49-75903
July 26, 1974 Japan .............................. 49-85072
Sept. 13, 1974 Japan .............................. 49-104849

[52] U.S. Cl. .................................. 526/15; 210/54;
526/142; 526/144; 260/29.6 H; 526/240;
260/30.2; 526/281; 528/481; 260/30.4 R;
428/337; 428/461; 260/30.6 R; 428/507;
260/30.8 R; 260/31.2 R; 260/32.6 R;
260/32.6 N; 260/33.4 R; 260/33.8 UA;
260/45.95 R; 260/345.2; 260/346.6; 260/874;
260/881; 260/885; 260/886; 260/887;
260/897 B; 260/897 C; 260/898; 260/899;
260/901; 526/27; 526/30; 526/41; 526/42;
526/47; 526/49; 526/56; 526/13 S
[51] Int. Cl.$^2$ .................. C08F 8/12; C08F 8/42;
C08F 8/46; C08F 22/04
[58] Field of Search ............... 260/78.4 R, 78.5 R,
260/78.5 I; 450/608, 726 R; 526/15

[56] References Cited
UNITED STATES PATENTS

| 3,494,897 | 2/1970 | Reding | 260/78.5 |
| 3,684,776 | 8/1972 | Field et al. | 260/78.5 T |
| 3,856,758 | 12/1974 | Ueshima et al. | 260/78.4 N |
| 3,859,265 | 1/1975 | Hepworth | 260/85.5 R |

*Primary Examiner*—Stanford M. Levin
*Attorney, Agent, or Firm*—Wenderoth, Lind & Ponack

[57] ABSTRACT

Processes for preparing novel polymers containing carboxyl or carboxylate groups which comprises hydrolyzing starting polymers containing acid anhydride groups in the presence of acids or alkalies, the starting polymers being prepared by ring-opening polymerization of acid anhydride-type norbornene derivatives, and the characteristics and utility of these novel polymers are disclosed.

13 Claims, 9 Drawing Figures

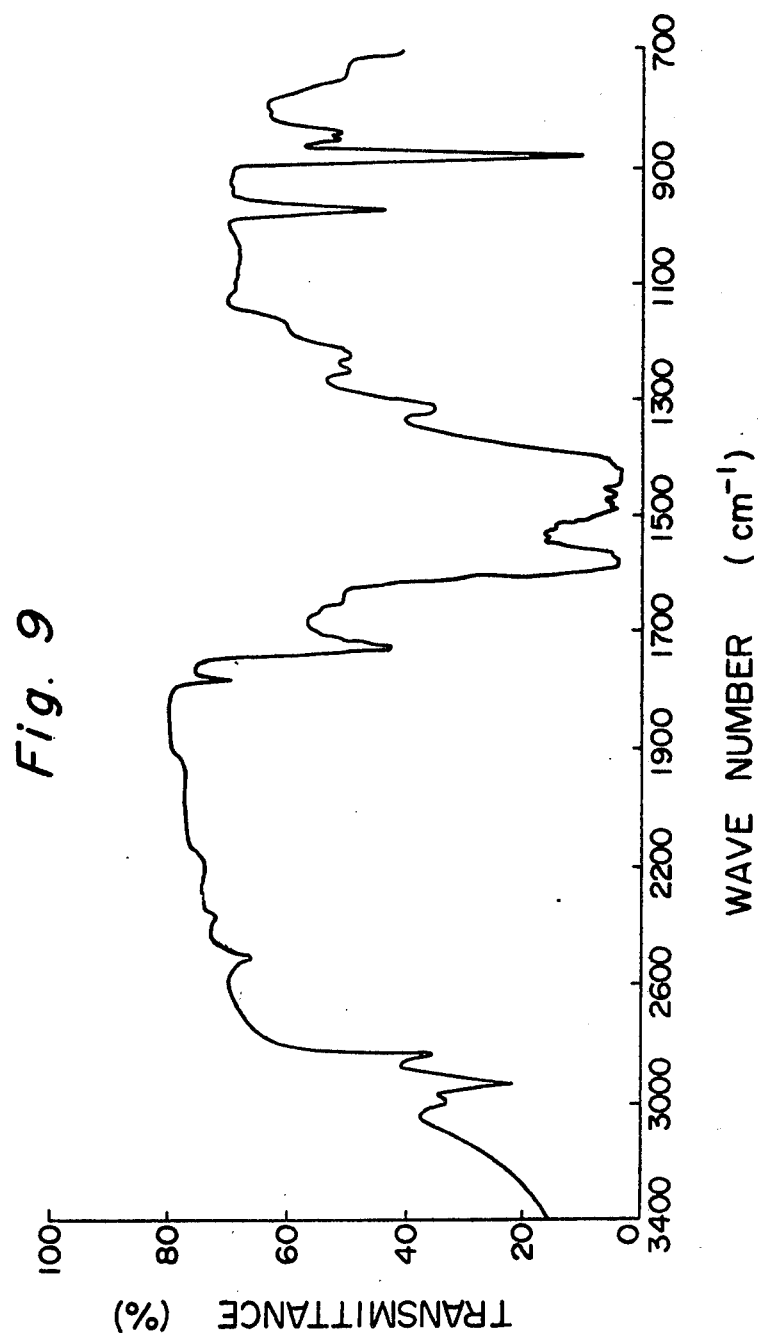

NOVEL POLYMER CONTAINING CYCLOPENTANYLVINYLENE UNITS

This invention relates to homopolymers composed of recurring units of formula (I) or (I') and copolymers composed of recurring units of formula (I) or (I') and other recurring units containing an unsaturated bond, and to processes for preparing these homopolymers and copolymers. These homopolymers and copolymers will be referred to hereinbelow as "polymers of this invention."

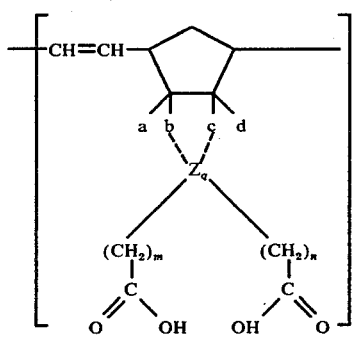
(I)

wherein Z is bonded to a carbon of a five-membered ring by any two of bonds $a$ to $d$, the remaining two bonds being filled by $R^1$ and $R^2$, and Z represents

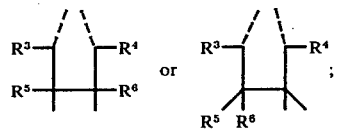

$R^1$ to $R^6$, independently from each other, represent a hydrogen atom or an alkyl radical containing 1 to 6 carbon atoms; an endomethylene linkage can exist between the carbon atom to which $R^3$ is attached and the carbon atom to which $R^4$ is attached; $q$ is 0 or 1; $m$ and $n$, independently from each other, are 0, 1 or 2.

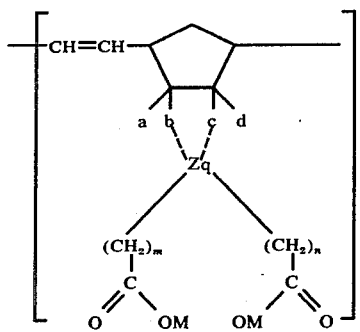
(I')

wherein M represents a hydrogen atom or a positive ion selected from the group consisting of alkali metals, alkaline earth metals and quaternary ammonium, with the proviso that at least 1 mole% of the existing M is the above ion other than hydrogen; and Z, $q$, $m$, and $n$ are the same as defined above.

The polymers of this invention are novel, and can be used for various applications such as molding polymers, polymeric flocculating agents, adhesives or ionexchange resins according to the properties of the individual species. These properties and some of these applications will be described hereinbelow.

The polymers of this invention can be prepared by hydrolyzing the corresponding homopolymers or copolymers containing recurring units of the following formula

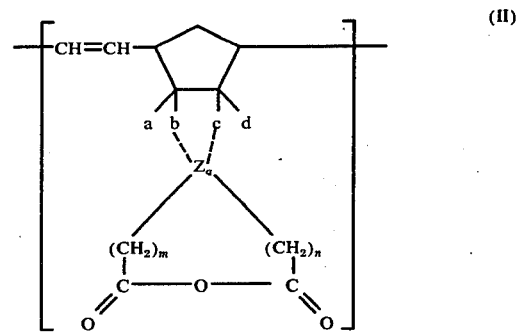
(II)

wherein Z, $q$, $m$ and $n$ are the same as defined above, with acids or basic substances; or hydrolyzing them in the presence of basic substances and treating the product with acids.

The homopolymers and copolymers containing the recurring units of formula (II) from which the polymers of this invention are derived will be referred to hereinbelow as "starting polymers." These starting polymers are also novel polymers prepared for the first time by some of the co-inventors of the present application, and these polymers and processes for their preparation are applied for a patent under U.S. application Ser. No. 507,556 (corresponding to British patent appln. No. 41299/74, German patent appln. No. P2445812.6 and French patent application No. 74,322 68).

Accordingly, prior to disclosing the present invention, it will be useful to describe the starting polymers for preparing the polymers of this invention, and processes for preparing these starting polymers.

The starting polymers used in this invention can be prepared by the ring-opening polymerization of norbornene derivatives.

Acid anhydride-type norbornene derivatives used as monomers for preparing the starting polymers by ring-opening polymerization can be prepared by subjecting cyclopentadiene and vinyl compounds containing a carboxylic anhydride group to a Diels-Alder reaction (H. L. Holmes, Organic Reactions, Vol. 4, pages 60 to 173, 1948, John Wiley and Sons, Inc.). They can also be prepared by reacting dicyclopentadiene with vinyl compounds containing a carboxylic anhydride group. In the acid anhydride-type norbornene derivatives so prepared, the substituents are bonded either in the endo-position or in the exo-position.

Vinyl compounds containing a carboxylic anhydride group used to synthesize the acid anhydride-type norbornene derivatives may be any unsaturated acid anhydrides. Typical examples of the unsaturated acid anhydride are maleic anhydride, itaconic anhydride, citraconic anhydride, and α-methylglutaconic anhydride.

Other examples of the unsaturated acid anhydrides used as a starting material for preparing the acid anhydride-type norborenene derivatives include products of a Diels-Alder reaction between the above unsaturated acid anhydrides and diene compounds such as butadiene, isoprene, 1,3-pentadiene, or cyclopentadiene. Examples of these reaction products are 4-cyclohexene-1,2-dicarboxylic anhydride, 3,6-methylene-1,2,3,6-tetrahydro-cis-phthalic anhydride, 1-carboxycyclohex-3-enylacetic anhydride of formula (A), 1-methyl-1,2,3,6-tetrahydrophthalic anhydride of formula (B), and 2-carboxycyclohex-3-enylacetic anhydride of formula (C).

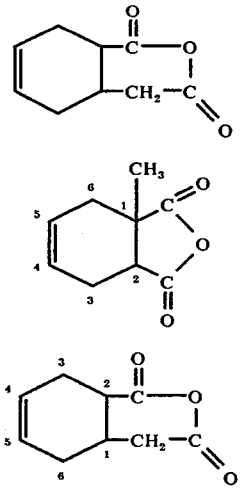

The acid anhydride-type norbornene derivatives uses as monomers for preparing the starting polymers of this invention contain groups with an acid anhydride linkage

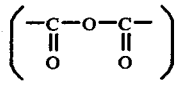

at the 5- or 6-position, or at both the 5- and 6-positions, of bicyclo[2.2.1]-heptene-2 (i.e., norbornene), and are expressed by the following formula

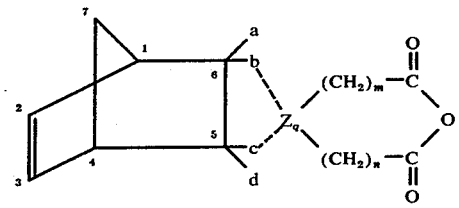

wherein Z, q, m and n are the same as defined hereinabove.

Typical examples of the acid anhydride-type norbornene derivatives are 3,6-methylene-1,2,3,6-tetrahydro-cis-phthalic anhydride, 5-(5-carboxy-bicyclo[2.2.1]-hept-2-enyl)acetic anhydride, 3,6-methano-1-methyl-1,2,3,6-tetrahydro-cis-phthalic anhydride, 2-oxa-1,3-dioxo-5,8-methano-1,2,3,4,4a,5,8,8a-octahydronaphthalene, 5,8-methano-1,2,3,4,4a,5,8,8a-octahydronaphthalene-2,3-dicarboxylic anhydride, 5,8-methano-1-methyl-1,2,3,4,4a,5,8,8a-octahydronaphthalene-2,3-dicarboxylic anhydride, 5,8-methano-2-methyl-1,2,3,3a,4,7,7a,8-naphthalene-2,3-dicarboxylic anhydride, 1,4,5,8-dimethano-1,2,3,4,4a,5,8,8a-octahydronaphthalene-2,3-dicarboxylic anhydride, 2-oxa-1,3-dioxo-1,2,3,4,4a,5,8,8a,9,9a,10,10a-dodecahydroanthracene, 1,4,5,8-dimethano-2-methyl-1,2,3,4,4a,5,8,8a-octahydronaphthalene-2,3-dicarboxylic anhydride, 2-(2-carboxy-1,4:5,8-dimethano-1,2,3,4,4a,5,8,8a-octahydronaphthyl)acetic anhydride, 2-oxa-1,3-dioxo-5,8:9,10-dimethane-1,2,3,4,4a,5,8-,8a,9,9a,10,10a-dodecahydroanthracene, 5,8-methano-1,2-dimethyl-1,2,3,4,4a,5,8,8a-octahydronaphthalene-2,3-dicarboxylic anhydride, 5,8-methano-1,3-dimethyl-1,2,3,4,4a,5,8,8a-octahydronaphthalene-2,3-dicarboxylic anhydride, 5,8-methano-4a-methyl-1,2,3,4,4a,5,8,8a-octahydronaphthalene-2,3-dicarboxylic anhydride, 5,8-methano-3,4a,-dimethyl-1,2,3,4,4a,5,8,8a-octahydronaphthalene-2,3-dicarboxylic anhydride, 5,8-methano-2,4a-dimethyl-1,2,3,4,-4a,5,8,8a-octahydronaphthalene-2,3-dicarboxylic anhydride, 2-oxa-1,3-dioxo-5,8-methano-9-methyl-1,2,3,4,4a,5,8,8a,-9,9a,10,10a-dodecahydroanthracene, 2-oxa-1,3-dioxo-5,8-methano-10-methyl-1,2,3,4,4a,5,8,8a,9,9a,10,10a-dodecahydroanthracene, 2-oxa-1,3-dioxo-5,8-methano-8a-methyl-1,2,3,4,4a,5,8,8a,9,9a,10,10a-dodecahydroanthracene and 2-oxa-1,3-dioxo-5,8-methano-10a-methyl-1,2,3,4,4a,5,8,8a,9a,10,10a-dodecahydroanthracene.

Preferred species of these acid anhydride-type norbornene derivatives are 3,6-methylene-1,2,3,6-tetrahydro-cis-phthalic anhydride, 5-(5-carboxy-bicyclo[2.2.1]-hept-2-enyl)acetic anhydride, 3,6-methano-1-methyl-1,2,3,6-tetrahydro-cis-phthalic anhydride, 2-oxa-1,3-dioxo-5,8-methano-1,2,3,4,4a,5,8,8a-octahydronaphthalene, 5,8-methano-1,2,3,4,4a,5,8,8a-octahydronaphthalene-1,2-dicarboxylic anhydride, 5,8-methano-1-methyl-1,2,3,4,4a,5,8,8a-octahydronaphthalene-2,3-dicarboxylic anhydride, 4,7-methano-1-methyl-1,2,3,3a,4,7,7a,8-naphthalene-1,2-dicarboxylic anhydride, 1,4,5,8-dimethano-1,2,3,4,4a,5,8,8a-octahydronaphthalene-2,3-dicarboxylic anhydride, and 2-oxa-1,3-dioxo-1,2,3,4,4a,5,8-,8a,9,9a,10,10a-dodecahydroanthracene.

Most preferred species among those listed above are 3,6-methylene-1,2,3,6-tetrahydro-cis-phthalic anhydride, 5-(5-carboxy-bicyclo[2.2.1]-hept-2-enyl)acetic anhydride, 3,6-methano-1-methyl-1,2,3,6-tetrahydro-cis-phthalic anhydride, 2-oxa-1,3-dioxo-5,8-methano-1,2,3,4,4a,5,8,8a-octahydronaphthalene.

Homopolymers prepared by ring-opening polymerization of the acid anhydride-type norbornene derivatives alone can be used as starting polymers in the present invention. It is also possible to use copolymers prepared by the ring-opening polymerization of two or more of the above-mentioned acid anhydride type-norbornene derivatives or a mixture of more than 1 mol% of any of the above norbornene derivatives and less than 99 mol% of an unsaturated cyclic compound. Typical examples of the unsaturated cyclic compound include cyano-type norbornene derivatives, estertype norbornene derivatives, ether-type norbornene derivatives, imide-type norbonene derivatives, aromatic norbornadiene derivatives, ester-type norbornadiene derivatives, amide-type norbornene derivatives, aromatic norbornene derivatives, and aromatic dimethanooctahydronaphthalene derivatives, cycloolefinic compounds and halogenated norbornene derivatives.

The cyano-type-norbornene derivatives used as a comonomer in preparing the starting polymer of this invention contain at least one nitrile group or at least one substituent containing a nitrile group at the 5- and/or 6-position of bicyclo[2.2.1]-heptene-2, as shown in the following general formula

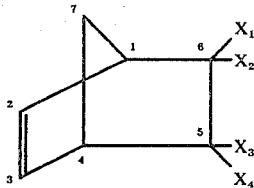

wherein $X_1$, $X_2$, $X_3$ and $X_4$, identical or different, are selected from the group consisting of a hydrogen atom, a nitrile group, hydrocarbon radicals selected from alkyl radicals containing 1 to 20 carbon atoms, alkenyl radical containing 2 to 20 carbon atoms, cycloalkyl radicals containing 4 to 20 carbon atoms, alkyl-substituted cycloalkyl radicals containing 5 to 20 carbon atoms, aryl radicals containing 6 to 20 carbon atoms and aralkyl radicals containing 7 to 20 carbon atoms, and the hydrocarbon radicals substituted by a nitrile group, at least one of $X_1$, $X_2$, $X_3$ and $X_4$ being a nitrile group or the nitrile-substituted hydrocarbon radical.

The hydrocarbon radicals substituted by a nitrile group include, for example, a cyanomethyl radical, cyanoethyl radical, cyanopropyl radical, cyano-n-butyl radical, cyano-isobutyl radical and ω-cyano-n-heptyl radical. The hydrocarbon radicals include, for example, a methyl radical, ethyl radical, propyl radical, n-butyl radical, isobutyl radical, octyl radical, phenyl radical, cyclohexyl radical and 2-octenyl radical.

Typical examples of the cyano-substituted norbornene derivatives are 5-cyano-bicyclo[2.2.1]-heptene-2, 5-methyl-5-cyano-bicyclo[2.2.1]-heptene-2, 5-ethyl-5-cyanobicyclo[2.2.1]-heptene-2, 5-n-propyl-5-cyano-bicyclo[2.2.1]-heptene-2, 5-n-butyl-5-cyano-bicyclo[2.2.1]-heptene-2, 5-isobutyl-5-cyano-bicyclo[2.2.1]-heptene-2, 5-n-octyl-5-cyano-bicyclo[2.2.1]-heptene-2, 5-phenyl-5-cyano-bicyclo[2,2,1]-heptene-2, 5-cyclohexyl-5-cyano-bicyclo[2.2.1]-heptene-2, 5-(2-octenyl)-5-cyano-bicyclo[2.2.1]-heptene-2, 5,5-dicyano-bicyclo[2.2.1]-heptene-2, 5,6-dicyano-bicyclo[2.2.1]-heptene-2, 5-methyl-6-cyano-bicyclo[2.2.1]-heptene-5-ethyl-6-cyano-bicyclo[2.2.1]-heptene-2, 5-n-butyl-6-cyano-bicyclo[2.2.1]-heptene-2, 5-isobutyl-6-cyano-bicyclo[2.2.1]-heptene-2, 5-phenyl-6-cyano-bicyclo[2.2.1]-heptene-2, 5-cyanomethyl-bicyclo [2.2.1]-heptene-2, 5-cyanoethyl-bicyclo[2.2.1]-heptene-2, 5-(cyano-n-butyl)-bicyclo[2.2.1]-heptene-2, 5-(cyano-isobutyl)-bicyclo[2.2.1]-heptene-2, 5-(ω-cyano-n-hepthy)-bicyclo [2.2.1]-heptene-2, and 5-cyanophenyl-bicyclo[2.2.1]-heptene-2. In this case, the substituent is attached to the carbon atom of norbornene either in the endo or exo position.

The ester-type norbornene derivatives used as comonomers in preparing the starting polymer of the invention contain at least one ester group or a substituent including the ester group at the 5- and/or 6-position of bicyclo [2.2.1]-heptene-2, as shown in the following general formula

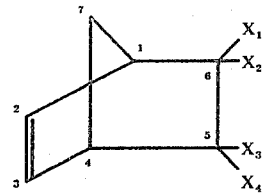

wherein $X_1$, $X_2$, $X_3$ and $X_4$, identical or different, are selected from the group consisting of a hydrogen atom, ester groups, hydrocarbon radicals selected from alkyl radicals containing 1 to 20 carbon atoms, alkenyl radicals containing 2 to 20 carbon atoms, cycloalkyl radicals containing 4 to 20 carbon atoms, alkyl-substituted cycloalkyl radicals containing 5 to 20 carbon atoms, aryl radicals containing 6 to 20 carbon atoms and aralkyl radicals containing 7 to 20 carbon atoms, and the hydrocarbon radicals substituted by an ester group, at least one of $X_1$, $X_2$, $X_3$ and $X_4$ being an ester group or the hydrocarbon group substituted by an ester group.

Typical examples of the ester-type norbornene derivatives are 5-methoxycarbonyl-bicyclo[2.2.1]-heptene-2, 5-ethoxycarbonyl-bicyclo[2.2.1]-heptene-2, 5-butoxycarbonylbicyclo[2.2.1]-heptene-2, 5-allyloxycarbonyl-bicyclo[2.2.1]-heptene-2, 5-methyl-5-methoxycarbonyl-bicyclo[2.2.1]-heptene-2, 5-hexyloxycarbonyl-6-methyl-cicyclo[2.2.1]-heptene-2, 5-ethoxycarbonyl-6-phenyl-bicyclo[2.2.1]-heptene-2, 5-heptyl-6-octyloxycarbonyl-bicyclo[2.2.1]-heptene-2, 5-methoxycarbonyl-6-methoxycarbonylmethyl-bicyclo-[2.2.1]-heptene-2, 5,6-dimethoxycarbonyl-bicyclo[2.2.1]-heptene-2, 5,6-diethoxycarbonyl-bicyclo[2.2.1]-heptene-2, 5,5-dibutoxycarbonyl-bicyclo[2.2.1]-heptene-2, 5-methyl-6,6-dimethoxycarbonyl-bicyclo[2.2.1]-heptene-2, 5-ω-methoxycarbonylheptyl-6-octylbicyclo[2.2.1]-heptene-2, 5-ω-methoxycarbonyl-2-decenyl-6-pentyl-bicyclo[2.2.1]-heptene-2, 5-ω-methoxycarbonylhepteyl-6-2-octenyl-bicyclo[2.2.1]-heptene-2, 5-acetoxymethyl-bicyclo[2.2.1]-heptene-2, 5-acetoxy-bicyclo[2.2.1]-heptene-2, 5-propionoxymethylbicyclo[2.2.1]-heptene-2, and 5-stearoxymethyl-bicyclo-[2.2.1]-heptene-2.

The ether-type norbornene derivatives used as comonomers in preparing the starting polymer of this invention contain at least one ether group or at least one substituent containing an ether group at the 5-and/or 6-position of bicyclo-[2.2.1]-heptene-2, as shown in the following general formula

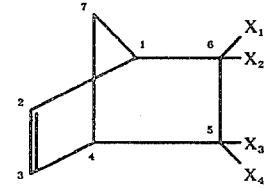

wherein $X_1$, $X_2$, $X_3$ and $X_4$, identical or different, are selected from the group consisting of a hydrogen atom, an ether group, hydrocarbon radicals selected from alkyl radicals containing 1 to 20 carbon atoms, alkenyl radicals containing 2 to 20 carbon atoms, cycloalkyl radicals containing 4 to 20 carbon atoms, alkyl-substituted cycloalkyl radicals containing 5 to 20 carbon atoms, aryl radicals containing 6 to 20 carbon atoms and aralkyl radicals containing 7 to 20 carbon atoms, and the hydrocarbon radicals substituted by an ether group, at least one of $X_1$, $X_2$, $X_3$ and $X_4$ being an ether group or the hydrocarbon radical substituted by an ether group.

Examples of the hydrocarbon radicals substituted by an ether group include a methoxy radical, ethoxy radical, propoxy radical, n-butoxy radical, isobutoxy radical, n-octyloxy radical, methoxymethyl radical, 2-methoxyethyl radical, phenoxy radical and benzyloxy radical. The hydrocarbon radicals include a methyl radical, ethyl radical, propyl radical, n-butyl radical, isobutyl radical, octyl radical, phenyl radical, cyclohexyl radical and 2-octenyl radical.

Typical examples of the ether type norbornene derivatives are 5-methoxy-bicyclo[2.2.1]-heptene-2, 5-ethoxy-bicyclo[2.2.1]-heptene-2, 5-n-propoxy-bicyclo[2.2.1]-heptene-2, 5-isopropoxy-bicyclo[2.2.1]-heptene-2, 5-n-butoxy-bicyclo[2.2.1]-heptene-2, 5-cyclohexoxybicyclo[2.2.1]-heptene-2, 5-methoxymethyl-bicyclo [2.2.1]-heptene-2, 5-butoxymethyl-bicyclo[2.2.1]-heptene-2, 5-methoxy-6-methoxymethyl-bicyclo[2.2.1]-heptene-2, and 5-phenoxy-bicyclo[2.2.1]-heptene-2. In this case, the substituent is attached to the carbon atom of norbornene either in the endo or exo position.

The imide type norbornene derivatives may be broadly divided into two types. They are, hereinafter, referred to as the "A-type" and "B-type" imide-type norbornene derivatives, respectively.

The A-type imide-type norbornene derivatives can be prepared by reacting primary amines with the aforementioned norbornene derivatives containing an acid anhydride group.

On the other hand, the B-type imide type norbornene derivatives can be easily obtained by reacting norbornene derivatives containing an amino group or a substituent containing an amino group with a cyclic carboxylic anhydride using a process similar to the N-phenyl maleimide synthesizing process proposed by M. P. Cava (see John D. Roberts, "Organic Syntheses", Vol. 41, pages 93 to 95, 1961, John Wiley and Sons, Inc.).

Typical examples of the A-type imide-type norbornene derivatives are N-substituted-3,6-methylene-1,2,3,6-tetrahydro-cis-phthalimidie compounds, N-substituted-3,6-methylene-1-methyl-1,2,3,6-tetrahydro-cis-phthalimide compounds, bicyclo[2.2.1]-hept-2-ene-5-spiro-3'-(N-substituted succinimide) compounds, 2-substituted-2-aza-1,3-dioxo-5,8-methano-1,2,3,4,4a,5,8,8a-octahydronaphthalene compounds, N-substituted-5,8-methanol,2,3,4,4a,5,8,8a-octahydronaphthalene-2,3-dicarboxyimide compounds, N-substituted-5,8-methano-2-methyl-1,2,3,4,4a,5,8,8a-octahydronaphthalene-2,3-dicarboxyimide compounds, 1,4-methano-1,4,4a,5,6,7,8,8a-octahydronaphthalene-6-spiro-3'-(N-substituted succinimide) compounds, 2-substituted-2-aza-1,3-dioxo-5,8-methano-1,2,3,4,4a,5,8,8a,9,9a,10,10a-dodecahydroanthracene compounds, N-substituted-1,4,5,8-dimethano-1,2,3,4,4a,5,8,8a-octahydronaphthalene-2,3-dicarboximide compounds, N-substituted-1,4,5,8-dimethano-2-methyl-1,2,3,4,4a,5,8,8a-octahydronaphthalene-2,3-dicarboxyimide compounds, 1,4,5,8-dimethano-2-methyl-1,2,3,4,4a,5,8,8a-octahydronaphthalene-2,3-dicarboximide compounds; N-subsituted-2-aza-5,8,9,10-dimethano-1,3-dioxo-1,2,3,4,4a,5,8,8a,9,9a,10,10a-dodecahydroanthracene compounds, and N-substituted-4-(5-bicyclo[2.2.1]-hept-2-enyl) phthalimide compounds.

Typical species of the N-substituted-3,6-methylene-1,2,3,6-tetrahydro-cis-phthalimide compounds have the following general formula

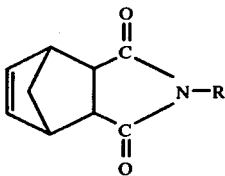

wherein R is a hydrocarbon radical selected from the group consisting of alkyl radicals containing 1 to 10 carbon atoms, alkenyl radicals containing 2 to 10 carbon atoms, cycloalkyl radicals or cycloalkenyl radicals containing 4 to 10 carbon atoms, aryl radicals containing 6 to 10 carbon atoms, aryl radicals substituted by an alkyl radical containing 1 to 10 carbon atoms and aralkyl radicals containing 7 to 10 carbon atoms, or —$(CH_2)_n$COOR' in which n is an integer of 1 to 10 and R' represents the above-mentioned hydrocarbon radical, or —$(CH_2)_m$—OCOR'' in which m is an integer of 1 to 10 and R'' represents the same hydrocarbon radical as R.

The N-substituted-3,6-methylene-1,2,3,6-tetrahydro-cis-phthalimide compounds may be typically exemplified by N-methyl-3,6-methylene-1,2,3,6-tetrahydro-cis-phthalimide, N-ethyl-3,6-methylene-1,2,3,6-tetrahydro-cis-phthalimide, N-hexyl-3,6-methylene-1,2,3,6-tetrahydro-cis-phthalimide, N-amyl-3,6-methylene-1,2,3,6-tetrahydro-cis-phthalimide, N-cyclohexyl-3,6-methylene-1,2,3,6-tetrahydro-cis-phthalimide, N-(4-methylcyclohexy)-3,6-methylene-1,2,3,6-tetrahydro-cis-phthalimide, N-phenyl-3,6-methylene-1,2,3,6-tetrahydro-cis-phthalmide, N-(4-ethylphenyl)-3,6-methylene-1,2,3,6-tetrahydro-cis-phthalimide, N-methoxycarbonyl-3,6-methylene-1,2,3,6-tetrahydro-cis-phthalimide, N-ethoxycarbonylmethyl-3,6-methylene-1,2,3,6-tetrahydro-cis-phthalimide, and N-acetoxy-3,6-methylene-1,2,3,6-tetrahydro-cis-phthalimide.

Other A-type imide type norbornene derivatives than the N-substituted-3,6-methylene-1,2,3,6-tetrahydro-cis-phthalimide compounds may be typically exemplified in the same manner as described above. The other A-type imide type norbornene derivatives have the general formula disclosed in Japanese Patent Application No. 123,329/73.

The B-type imide-type norbornene derivatives typically include, for example, N-[-ω(5-bicyclo[2.2.1]-hept-2-enyl)alkyl substituted]-maleimide compounds, N-[ω-5-bicyclo[2.2.1]-hept-2-enyl) alkyl substituted]-citraconimide còmpounds, N-[ω-[5-bicyclo[2.2.1]-hept-2-enyl) alkyl substituted]-glutaconimide compounds, N-[ω-(5-bicyclo-[2.2.1-hept-2-enyl) alkyl substituted]-succinimide compounds, N-[ω-(5-bicyclo[2.2.1]-hept-2-enyl) alkyl substituted]-phthalimide compounds, N-[ω-(5-bicyclo[2.2.19 -hept-2-enyl]alkyl substituted]-naphthalene-1,8-dicarboximide compounds, and N-[ω-(5-bicyclo[2.2.1]-hept-2-enyl)alkyl substituted]-naphthalene-2,3-dicarboximide compounds.

Typical examples of the N-[ω-(5-bicyclo[2.2.1]-hept-2-enyl)alkyl substituted] maleimide compounds are expressed by the following general formula

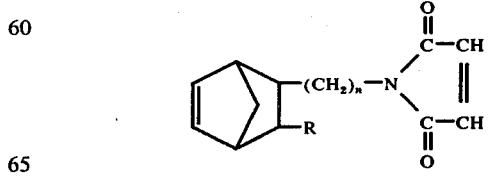

wherein R is an alkyl radical containing 1 to 20 carbon atoms and n is an integer of 1 to 20.Typical examples of the N-[ω-(5-bicyclo[2.2.1]-hept-2-enyl) alkyl substituted]maleimide compounds are N-(5-bicyclo[2.2.1]-hept-2-enyl)methylmaleimide, N-[3-(5-bicyclo[2.2.1]-hept-2-enyl)propyl]maleimide, N-[6-(5-bicyclo[2.2.1]-hept-2-enyl)hexyl]maleimide, N-[12-(5-bicyclo[2.2.1]-hept-2-enyl) dodecyl]maleimide, N-(6-methyl-5-bicyclo[2.2.1]-hept-2-enyl)methylmaleimide, N-[4-(6-methyl-5-bicyclo[2.2.1]-hept-2-enyl)butyl]maleimide, N-[10-(6-methyl-5-bicyclo[2.2.1]-hept-2-enyl)decyl] maleimide, N-[16-(6-methyl-5-bicyclo[2.2.1]-hept-2-enyl) hexadecyl]maleimide, N-(6-ethyl-bicyclo[2.2.1]-hept-2-enyl)methylmaleimide, N-[2-(6-ethyl-5-bicyclo[2.2.1]-hept-2-enyl)ethyl] maleimide, N-[8-(6-ethyl-5-bicyclo[2.2.1]-hept-2-enyl)octyl] maleimide, N-[18-(6-ethyl-5-bicyclo[2.2.1]-hept-2-enyl) octadecyl] maleimide, N-[3-(6-propyl-5-bicyclo[2.2.1]-hept-2-enyl) propyl] maleimide, N-[9-(6-propyl-5-bicyclo[2.2.1]-hept-2-enyl) nonyl] maleimide, N-[11-(6-butyl-5-bicyclo[2.2.1]-hept-2-enyl) undecyl] maleimide, N-(6-hexyl-5-bicyclo[2.2.1]-hept-2-enyl) methyl-maleimide, N-(6-dodecyl-5-bicyclo[2.2.1]-hept-2-enyl) methylmaleimide, N'-[12-(6-dodecyl-5-bicyclo-[2.2.1]-hept-2-enyl) dedecyl] maleimde, and N-(6-octadecyl-5-bicyclo[2.2.1]-hept-2-enyl) methymaleimide.

Examples of B-type imide-type norbornene derivatives other than the N-[ω-(5-bicyclo[2.2.1]-hept-2-enyl)alkyl substituted] maleimide compounds are those corresponding to the above examples. The other B-type imide-type norbornene derivatives are expressed by the general formula given in Japanese Patent Application No. 123329/73.

The aromatic norbornene derivates contains at least one aromatic hydrocarbon radical or at least one substitutent containing an aromatic hydrocarbon radical at the 5- and/or 6-positions of the bicyclo[2.2.1]-heptene-2 (i.e., norbornene).

Typical species of the aromatic nobornene derivatives are expressed by the following general formula

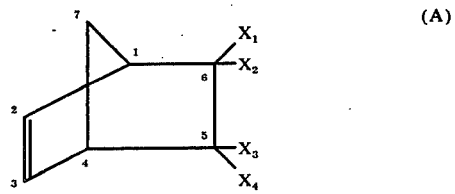

(A)

The aromatic dimethanooctahydronaphthalene derivatives contain at least one aromatic hydrocarbon radical or at least one substituent containing an aromatic hydrocarbon radical at the 2- and/or 3-position of the 1,4:5,8-dimethano-1,2,3,4,5,8,8a-octahydronaphthalene. Typical species of said aromatic dimethanooctahydronaphthalene derivatives are expressed by the following general formula (B)

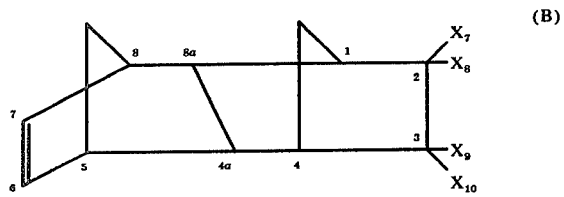

(B)

In the above structural formulae (A) and (B), $X_1$, $X_2$, $X_3$, $X_4$, $X_7$, $X_8$, $X_9$ and $X_{10}$ are identical or different, and each represent a member selected from the group consisting of a hydrogen atom, aromatic hydrocarbon radicals, substituents containing an aromatic hydrocarbon radical, and alkyl or alkenyl radicals containing 1 to 20 carbon atoms. Furthermore, at least one of $X_1$, $X_2$, $X_3$ and $X_4$ and at least one of $X_2$, $X_8$, $X_9$ and $X_{10}$ are an aromatic hydrocarbon radical or a substituent containing an aromatic hydrocarbon radical. The substituent is expressed by any of the following general formulae

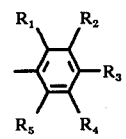 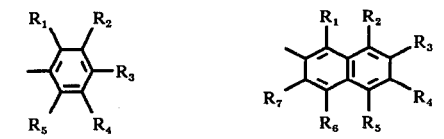

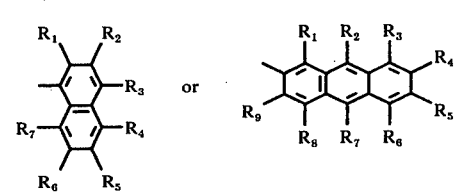

wherein $R_1$, $R_2$, $R_3$, $R_4$, $R_5$, $R_6$, $R_7$, $R_8$ and $R_9$ are identical or different, and selected from the group consisting of a hydrogen atom, alkyl or alkenyl radicals containing 1 to 20 carbon atoms, cycloalkyl radicals containing 4 to 10 carbon atoms, aryl radicals containing 6 to 10 carbon atoms and aralkyl radicals containing 7 to 10 carbon atoms.

The aromatic norbornene derivatives typically include, for example, 5-phenyl-bicyclo[2.2.1]-heptene-2, 5-methyl-5-phenyl-bicyclo[2.2.1]-heptene-2, 5,5-diphenylbicyclo[2.2.1]-heptene-2, 5-hexyl-5-phenyl-bicyclo[2.2.1]-heptene-2, 5-decenyl-5-phenyl-bicyclo[2.2.1]-heptene-2, 5-cyclohexyl-5-phenyl-bicyclo[2.2.1]-heptene-2, 5-phenyl-6-ethyl-bicyclo[2.2.1]-heptene-2, 5-α-naphthyl-bicyclo-[2.2.1]-heptene-2, and 5-(P-tolyl)-bicyclo[2.2.1]-heptene-2.

The aromatic dimethanooctahydronaphthalene derivatives may be typically exemplified by 2-phenyl-1,4:5,8-dimethano-1,2,3,4,4a,5,8,8a-octahydronaphthalene, 2-methyl-2-phenyl-1,4:5,8-dimethano-1,2,3,4,4a,5,8,8a-octahydronaphthalene, 2-n-butyl-2-phenyl-1,4:5,8-dimethano-1,2,3,4,4a,5,8,8a-octahydronaphthalene, 2-cyclohexyl-1,4:5,8-dimethano-1,2,3,4,4a,5,8,8a-octahydronaphthalene, 2,2,2- or 2,3-diphenyl-1,4:5,8-dimethano-1,2,3,4,4a,5,8,8a-octahydronaphthalene, 2-(p-tert-butyl-phenyl)-1,4:5,8-dimethano-1,2,3,4,4a,5,8,8a-octahydronaphthalene, 2-decyl-2-phenyl-1,4:5,8-dimethano-1,2,3,4,4a,5,8,8a-octahydronaphthalene, and 2-α-anthryl-1,4:5,8-dimethano-1,2,3,4,4a, 5,8,8a-octahydronaphthalene.

Other aromatic norbornene derivatives and aromatic dimethanooctahydronaphthalene derivatives than those described above and methods for preparing them are disclosed in Japanese Patent Application No. 61851/74.

The amide-type norbornene derivatives contain at least one N,N-disubstituted carbonamide radical or at least one substituent containing an N,N-disubstituted carbonamide radical at the 5- and/or 6-positions of the bicyclo[2.2.1]-heptene-2. Typical examples of the amide-type norbornene derivatives are expressed by the following general formula

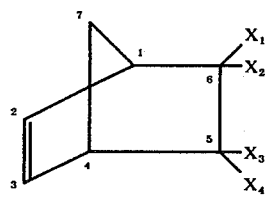

wherein $X_1$, $X_2$, $X_3$ and $X_4$, identical or different, are selected from the group consisting of a hydrogen atom, alkyl radicals containing 1 to 20 carbon atoms, alkenyl radicals containing 2 to 20 carbon atoms, cycloalkyl radicals containing 4 to 20 carbon atoms, alkyl-substituted cycloalkyl radicals containing 5 to 20 carbon atoms aryl radicals containing 6 to 20 carbon atoms, aralkyl radicals, containing 7 to 20 carbon atoms and N- disubstituted carboamide radicals

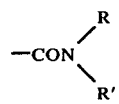

in which R and R' are identical or different and selected from the group consisting of a hydrogen atom and the above mentioned hydrocarbon radicals.

The amide type norbornene derivatives typically include, for example, N,N-dimethyl-bicyclo[2.2.1]-heptene-2-carboamide-5, N-methyl-N-ethyl-bicyclo[2.2.1]-heptene-2-carbonamide-5, N-methyl-N-octyl-bicyclo[2.2.1]-heptene-2-carbonamide-5, N,N-dicyclohexyl-bicyclo[2.2.1]-heptene-2-carboamide-5, N,N-di(methylcyclohexyl)-bicyclo[2.2.1]-heptene-2-carbonamide-5, N,N-diphenyl-bicyclo[2.2.1]-heptene-2-carbonamide-5, N,N-dibenzyl-bicyclo[2.2.1]-heptene-2-carbonamide-5, N,N-di(3-methylphenyl)-bicyclo[2.2.1]-heptene-2-carbonamide-5, N,N-dimethyl-5-methyl-bicyclo-[2.2.1]-heptene-2-carbonamide-5, N,N-dimethyl-5,6-methyl-bicyclo[2.2.1]-heptene-2-carbonamide-5, N,N-diethyl-5-hexyl-bicyclo[2.2.1]-heptene-2-carbonamide-5, N,N-di(cyclohexyl)-5-phenyl-bicyclo[2.2.1]-heptene-2-carbonamide-5, N,N-diphenyl-5-methyl-bicyclo[2.2.1]-heptene-2-carbonamide-5, and N,N,N',N'-tetramethyl-bicyclo[2.2.1]-heptene-2-carbonamide-5. Other amide-type norbornene derivatives are disclosed in Japanese Patent Application No. 129581/74.

The aromatic norbornadiene derivatives are compounds in which carbon atoms occupying the 5- and 6-positions of formula (C) of the bicyclo[2.2.1]-heptene-2(namely, norbornene) concurrently constitute the two adjacent carbon atoms of an aromatic cyclic compound. Typical examples of the aromatic norbornadiene derivatives are expressed by either of the following general formula (D) of (E)

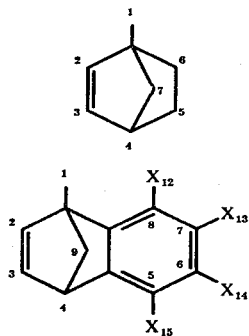

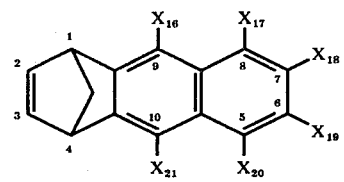

wherein $X_{12}$, $X_{13}$, $X_{14}$, $X_{15}$, $X_{16}$, $X_{17}$, $X_{18}$, $X_{19}$, $X_{20}$ and $X_{21}$, identical or different, are selected from the group consisting of a hydrogen atom, alkyl radicals containing 1 to 10 carbon atoms, alkenyl radicals containing 2 to 10 carbon atoms, cycloalkyl radicals containing 1 to 10 carbon atoms, aryl radicals containing 6 to 10 carbon atoms and aralkyl radicals containing 7 to 10 carbon atoms or polar radicals selected from the group consisting of a nitrile group, ester groups, halogen atoms and the above-mentioned hydrocarbon radicals containing such polar radicals.

The aromatic norbornadiene derivatives may be typically exemplified by 1,4-dihydro-1,4methanonaphthalene, 1,4-dihydro-1,4-methano-6-methylnaphthalene, 1,4-dihydro-1,4methano-6-methoxynaphthalene, 1,4-dihydro-6-fluoro-1,4-methanonaphthalene, 6-chloro-1,4-dihydro-1,4-methano-naphthalene, 6-cyano-1,4-dihydro-1,4-methanonaphthalene, 5,8-diacetoxy-1,4-dihydro-1,4-methanonaphthalene, 5,8-diacetoxy-1,4-dihydro-6,7-dimethyl-1,4-methanonaphthalene, 9,10-diacetoxy-1,4-dihydro-1,4-methanoanthracene, and 1,4-dihydro-9,10-diphenyl-1,4-methanoanthracene.

The method of preparing the aromatic norbornadiene derivatives and typical examples of their derivatives are described in Japanese Patent Application No. 109295/73.

The ester type norbornadiene derivatives have at least one ester group or at least one substituent containing an ester group at the 2- and/or 3-position of the bicyclo [2.2.1]-heptadiene-2,5. Typical species of the ester type norbornadiene derivatives are expressed by the following general formula

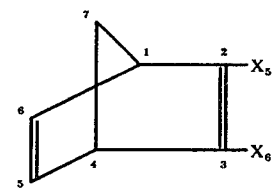

wherein $X_5$ and $X_6$ are identical or different and selected from the group consisting of a hydrogen atom, alkyl radicals containing 1 to 10 carbon atoms, alkenyl radicals containing 2 to 10 carbon atoms, cycloalkyl radicals containing 1 to 10 carbon atoms, alkyl-substituted cycloalkyl radicals containing 5 to 10 carbon atoms, aryl radicals containing 6 to 10 carbon atoms, ester groups and hydrocarbon radicals substituted by ester groups, at least one of $X_5$ and $X_6$ being an ester group or the hydrocarbon radical containing an ester group.

The ester-type norbornadiene derivatives typically include, for example, 2-methoxycarbonyl-bicyclo[2.2.1]-hepta-2,5-diene, 2-butyloxycarbonyl-bicyclo[2.2.1]-hepta-2,5-diene, 2-octyloxycarbonyl-bicyclo[2.2.1]-hepta-2,5-diene, 2-decyloxycarbonyl-bicyclo2.2.1]-hepta-2,5-diene, 2-methoxycarbonyl-3-methyl-bicyclo[2.2.1]-hepta-2,5-diene, 2-ethoxycarbonyl-3-hexyl-bicyclo[2.2.1]-hepta-2,5-diene, 2-methoxycarbonyl-3-cyclohexyl-bicyclo[2.2.1]-hepta-2,5-diene, 2-ethoxycarbonyl-3-(4-methylcyclohexyl)-bicyclo-[2.2.1]-hepta-2,5-diene, 2-methoxycarbonyl-3-phenylbicyclo-[2.2.1]-hepta-2,5-diene, 2-ethoxycarbonyl-3-tolylbicyclo[2.2.1]-hepta-2,5-diene, 2,3-dimethoxycarbonylbicyclo[2.2.1]-hepta-2,5-diene, 2-methoxycarbonyl-3-ethoxycarbonyl-bicyclo[2.2.1]-hepta-2,5-diene, 2-acetoxymethyl-bicyclo[2.2.1]-hepta-2,5-diene, 2-caproyloxy-3-methyl-bicyclo[2.2.1]-hepta-2,5-diene, 2-ethoxycarbonyl-3-hexyloxycarbonyl-bicyclo[2.2.1]-hepta-2,5-diene, 2,3-di(propionyloxymethyl)-bicyclo[2.2.1]-hepta-2,5-diene, 2-acetoxymethyl-3-cyclohexyl-bicyclo[2.2.1]-hepta-2,5-diene, 2-valeryloxy-3-ethyl-bicyclo[2.2.1]-hepta-2,5-diene, 2-valeryloxymethyl-decyl-bicyclo[2.2.1]-hepta-2,5-diene, and 2-valeryloxymethyl-3-phenyl-bicyclo[2.2.1]-hepta-2,5-diene.

The method of preparing the ester-type norbornaidene derivatives and typical examples of these derivatives other than those listed above are disclosed in Japanese Patent Application No. 9208/74.

The cycloolefinic compounds used as the unsaturated cyclic compounds in preparing the starting polymers of this invention are broadly classified into three groups: (1) monocyclic monoolefinic compounds, (2) non-conjugated cyclic polyene compounds containing at least two carbon-carbon double bonds (hereinafter referred to as "non-conjugated cyclic polyene compounds") and (3) polycyclic olefinic compounds containing one carbon-carbon double bond (hereinafter referred to as "polycyclic olefinic compounds").

The monocyclic monoolefinic compounds preferably contain up to 20 carbon atoms in order to prepare the starting polymers used in the process of this invention. Typical examples of the monocyclic monoolefinic compounds are cyclobutene, cyclopentene, cycloheptene, cyclooctene and cyclododecene.

The non-conjugated cyclic polyene compounds are either monocyclic or polycyclic, and preferably contain 6 to 20 carbon atoms in order to prepare the starting polymers used in the process of this invention. Examples of the non-conjugated cyclic polyene compounds are 1,5-cyclooctadiene, dicyclopentadiene, 1,5,9-cyclododecatriene and 1-chloro-1,5-cyclooctadiene.

The polycyclic olefinic compounds preferably contain up to 20 carbon atoms in order to prepare the starting polymers used in the process of this invention. Typical examples of the polycyclic olefinic compounds are bicyclo[2.2.1]-heptene-2-(norbornene), 5-methyl-bicyclo[2.2.1]-heptene-2, 5,5 or 5,6-dimethyl-bicyclo[2.2.1]-heptene-2, 1,4:5,8-dimethano-1,2,3,4,4a,5,8,8a-octahydronaphthalene, 2-methyl-1,4:5,8-dimethano-1,2,3,4,4a,5,8,8a-octahydronaphthalene, isoprophenyl-bicyclo[2.2.1]-heptene-2, and 2-n-propyl-1,4:5,8-dimethano-1,2,3,4,4a,5,8,8a-octahydronaphthalene.

The halogenated norbornene derivatives used as monomers in preparing the starting polymers of this invention contain at least one halogen atom or at least one halogen-containing substituent at the 5- and/or 6-positions of the bicyclo [2.2.1]-heptene-2, as shown in the following general formula

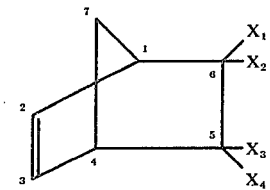

wherein $X_1$, $X_2$, $X_3$ and $X_4$, identical or different, are selected from the group consisting of a hydrogen atom, halogen atoms, hydrocarbon radicals selected from alkyl radicals containing 1 to 20 carbon atoms, alkenyl radicals containing 2 to 20 carbon atoms, cycloalkyl radicals containing 4 to 20 carbon atoms, alkyl-substituted cycloalkyl radicals containing 5 to 20 carbon atoms, aryl radicals containing 6 to 20 carbon atoms, and aralkyl radicals containing 7 to 20 carbon atoms, and the hydrocarbon radicals substituted by a halogen atom, at least one of $X_1$, $X_2$, $X_3$ and $X_4$ being the halogen atom or the halogen-substituted hydrocarbon radical.

The halogenated nobornene derivatives can be synthesized by a Diels-Alder reaction of cyclopentadiene or dicyclopentadiene with halogen-bearing compounds such as vinyl chloride, 1,2-dichloroethylene, vinyl bromide, or vinylidene chloride. Typical examples of the halogen-type norbornene derivatives are 5-chloro-bicyclo[2.2.1]-heptene-2, 5,5-dichloro-bicyclo[2.2.1]-heptene-2, 5,6-dichloro-bicyclo[2.2.1]-heptene-2, 5,5,6-trichloro-bicyclo[2.2.1]-heptene-2, 5,5,6,6-tetrachloro-bicyclo[2.2.1]-heptene-2, 5-chloromethyl-bicyclo[2.2.1]-heptene-2, 5,6-di(chloromethyl)-bicyclo[2.2.1]-heptene-2, 5-chloro-5-methyl-bicyclo[2.2.1]-heptene-2, 5-chloro-6-methyl-bicyclo[2.2.1]-heptene-2, 5-chloromethyl-6-methyl-bicyclo[2.2.1]-heptene-2, 5-($\beta$-chloroethyl)-bicyclo[2.2.1]-heptene-2, 5-($\alpha$-chloroethyl)-bicyclo[2.2.1]-heptene-2, 5-($\alpha$-chloropropyl)-bicyclo[2.2.1]-heptene-2, 5-($\gamma$-chloropropyl)-bicyclo[2.2.1]-heptene-2, 5-($\beta$-chloroethyl)-6methyl-bicyclo[2.2.1]-heptene-2, and 5-chloromethyl-6-ethyl-bicyclo[2.2.1]-heptene-2.

The acid anhydride-, cyano-, ester-, ether-, amide- and aromatic-type norbornene derivatives, halogenated norbornene derivatives, aromatic dimethanooctahydronaphthalene derivatives, and some (for example, 5-methyl-bicyclo[2.2.1]-heptene-2) of the cycloolefinic compounds all have at least two types of isomers. In the case of the typical compounds with one substituent, for example, they are referred to as the endo- and exo-types according to the manner in which the substituent is attached to the chain. In order to prepare the starting polymers used in the process of this invention, these unsaturated cyclic compounds are used either after separating them into the isomers by, for example, precise fractional distillation or recrystallization, or without separating them (that is, in the form of an isomeric mixture).

In the case of the cyano-, ester- and ether-type norbornene derivatives, a larger total number of carbon atoms contained in the radicals $X_1$, $X_2$, $X_3$ and $X_4$ given in the general formulae expressing these derivatives undesirably leads to the lower heat resistance of the resultant ring-opening polymerization product. Therefore, the radicals $X_1$, $X_2$, $X_3$ and $X_4$ preferably contain up to 10 carbon atoms, more preferably up to 6 carbon atoms, in total.

Likewise, with the halogenated norbornene derivatives, a larger total number of carbon atoms contained in the radicals $X_1$, $X_2$, $X_3$ and $X_4$ undesirably results in the lower heat resistance of the ring-opening polymerization product obtained. Therefore, $X_1$, $X_2$, $X_3$ and $X_4$ preferably contain up to 10 carbon atoms, more preferably up to 6 carbon atoms, in total.

Ring-opening polymerization products prepared from those halogenated derivatives which contain two or more halogen atoms display not only excellent flame retardancy but also high heat resistance and are particularly suitable where it is desired to provide compositions having such superior properties.

Ring-opening polymerization products prepared from those A-type imide-type norbornene derivatives in which the radical R given in the general formula contains a large number of carbon atoms and the ring-opening polymerization products prepared from those B-type imide-type norbornene derivatives in which the radical R given in the general formula contains a large number of carbon atoms and $n$ in the formula represents a large integer generally have low heat resistance or workability. When, therefore, it is desired to obtain a composition having excellent heat resistance or workability, the use of the above-mentioned types of ring-opening polymerization product is not preferred. Consequently, with the A-type imide-type norbornene derivatives, the radical R given in the general formula preferably contains not more than 8 carbon atoms, more preferably nor more than 6 carbon atoms. With the B-type imide-type norbornene derivatives, the radical R given in the general formula preferably contains not more than 6 carbon atoms, more preferably not more than 4 carbon atoms, and $n$ given in the formula is preferably an integer of not more than 6, more preferably not more than 4.

With the amide- and aromatic-type norbornene derivatives and aromatic dimethanooctahydronaphthalene derivatives, a larger total number of carbon atoms contained in the radicals $X_1$ to $X_4$, or $X_7$ to $X_{10}$ given in the general formulas undesirably gives rise to a polymer with a lower heat resistance, which in turn deteriorates the heat resistance of a composition prepared from this polymer. Accordingly, the radicals $X_1$ to $X_4$ or $X_7$ to $X_{10}$ preferably contain not more than 8 carbon atoms, more preferably not more than 6 carbon atoms, in total.

If in the aromatic norbornadiene derivatives, the number of carbon atoms of other rings in larger than that of carbon atoms in the norbornadiene ring, the mechanical properties, heat resistance and workability of the resultant ring-opening polymerization product are generally deteriorated. For this reason, such aromatic norbornadiene derivatives are not acceptable where it is desired to provide compositions having superior mechanical properties heat resistance and workability. Preferably, the rings other than the norbornadiene ring contain not more than 20 carbon atoms, more preferably not more than 16 carbon atoms.

With the ester-type norbornadiene derivatives, a larger total number of carbon atoms contained in the radicals $X_5$ and $X_6$ given in the general formula tends to deteriorate the mechanical properties, heat resistance and workability of the resultant ring-opening polymerization product. Such ester-type norbornadiene derivatives are not preferred where it is desired to provide a composition having superior mechanical properties, heat-resistance and workability. Therefore, the radicals $X_5$ and $X_6$ given in the general formula of the ester-type norbornadiene derivatives preferably contain not more than 16 carbon atoms, more preferably not more than 12 carbon atoms, in total.

Obviously, the above-mentioned requirements are governed by the proportions of the aforesaid unsaturated cyclic compounds in the resulting copolymer, and of course, affected by various polymerization conditions in the preparation of the ring-opening polymerization product, such as the kind and proportion of a catalyst system, the kind and proportion of a third catalyst component if used, the proportion of the catalyst system based on the monomer, the polymerization temperature, and the kind and proportion of a molecular weight controlling agent, if used.

Copolymers derived from the acid anhydride-type norbornene derivatives and not more than 85 mol%, especially not more than 70 mol%, of the unsaturated cyclic compounds are preferably used as the starting polymers of this invention. When the unsaturated cyclic compound is a halogen-type norbornene derivative, amide-type norbornene derivative or ester-type norbornadiene derivative, its proportion in the copolymer is more preferably not more than 50 mol%. When the unsaturated cyclic compound is an aromatic norbornene derivative or aromatic dimethanooctahydronaphthalene derivative, its proportion in the copolymer is preferably not more than 20 mol%, especially not more than 10 mol%.

The aforesaid homopolymers of the acid anhydride-type norbornene derivatives or copolymers of any combination of these derivatives or other copolymers of these derivatives with 99 mol% at most of unsaturated cyclic compounds can be prepared in the presence of a catalyst system (hereinafter referred to as a "catalyst system A") comprising compounds of tungsten and/or molybdenum and organic aluminium compounds or both of these compounds and another compound (a third component), or a catalyst system (hereinafter referred to as a "catalyst system B") comprising oxides of tungsten and Lewis acids or both of these components and organic aluminium compounds with or without inert organic solvents.

Typical examples of the compounds of tungsten and molybdenum are tungsten hexachloride, molybdenum pentachloride, tungsten oxytetrachloride ($WOCl_4$) and aluminium-tungsten halides (for example, $Al_4W_3Cl_{18}$) obtained by reducing tungsten halides with an aluminium powder.

Organic aluminium compounds constituting a part of the catalyst system used in the ring-opening polymerization have a chemical structure expressed by the general formula $AlR_3$ or $AlR_nX_{3-n}$ wherein R represents an alkyl, aryl, or aralkyl radical, X represents a halogen atom, a hydrogen atom, or an alkoxy radical, and $n$ is 1, 1.5, or 2, or $AlR_3 \cdot H_2O$ wherein the mole ratio of $H_2O$ to $AlR_3$ is less than 1.5. Of these, especially preferred species are triethyl aluminium, triisobutyl aluminium, trihexyl aluminium, diethyl aluminium monochloride, di-n-butyl aluminium monochloride, ethyl aluminium sesquichloride, diethyl aluminium monobutoxide and a mixture of triethyl aluminium and water in which the mole ratio of triethyl aluminium to water is 1 : 0.5.

Catalytic compounds other than the tungsten compounds the molybdenum compounds and organic aluminium compounds exemplified above are disclosed in Japanese Patent Applications Nos. 31755/72 and 108902/72, and U.S. Pat. No. 3,856,758.

The mole ratio of the organic aluminium compound to the compound of tungsten or molybdenum is generally more than 0.1, preferably more than 0.5. Use of less than 0.1 mole of the organic aluminium compound per mole of the compound of tungsten or molybdenum cannot give any feasible polymerization activity. A catalyst system comprising 10 moles of the organic aluminium compound per mole of the compound of tungsten or molybdenum achieves an extremely high degree of polymerization activity.

A third component whose proportion varies with its type should preferably be used in an amount of not more than 10 moles, usually not more than 5 moles per mole of the compound of tungsten or molybdenum. If the amount of the third component is larger than 10 moles, the polymerization activity of the resultant catalyst system does not increase.

While the amount of the catalyst system added to the monomeric norbornene derivative varies mainly with the type of the monomer, the compound of tungsten or molybdenum should generally be added in an amount of 0.001 to 20 moles, preferably 0.1 to 5 moles, based on 100 moles of the monomer. Addition of more than 20 moles of the compound of tungsten or molybdenum based on 100 moles of the monomer not only results in a high cost of production, but also cannot increase the polymerization activity of the catalyst system. Furthermore, if unduly large amounts of the compound of tungsten or molybdenum are used, the reaction system will contain residual tungsten or molybdenum compounds in such amounts as will be difficult to eliminate after the ring-opening polymerization.

Generally, the ring-opening polymerization is carried out at a temperature ranging from −100° C. to +200° C., preferably from −40° C. to +150° C., more preferably from room temperature to +100° C. At a temperature lower than −100° C., the reaction system does not exhibit a feasible polymerization activity so that the progress of the polymerization is extremely slow. In such a case, the polymerization is very time-consuming and causes the solidification of a mixture of the inert organic solvent and the monomer. On the other hand, temperatures higher than 200° C. fail to provide polymers of good quality and are undesirable for practical purposes.

Examples of the third component used in forming the catalyst system (A) include water, hydrogen peroxide, oxygen-bearing organic compounds (e.g., alkyl peroxides, epoxides, acetal compounds, alcoholic compounds, carboxylic acids or anhydrides thereof, carboxylic acid esters, and ketones), nitrogen-bearing organic compounds (for example, amines, nitrogen-bearing heterocyclic compounds and acid amides), halogen-bearing organic compounds (for example, halogenated aromatic hydrocarbons, tertiary hypohalites and halogenated alcoholic compounds), phosphorus-bearing organic compounds (for example, phosphine compounds, phosphine oxides, phosphites and phosphates), sulfur-bearing organic compounds (for example, sulfides, sulfoxides and sulfones), and metal-bearing organic compounds (for example, metal salts of saturated monovalent carboxylic acids contain up to 30 carbon atoms, saturated carboxylic acids contain up to 30 carbon atoms and containing a cycloalkyl radical or substituted cycloalkyl radical or carboxylic acid containing up to 30 carbon atoms and containing phenyl radical or substituted phenyl radical).

Other kinds of the tungsten and molybdenum compounds, organic aluminium compounds and third catalytic components, their typical examples and the ratio in which the three components are used, and the proportions of the components based on the monomer used in the ring-opening polymerization are shown in Japanese Patent Application No. 31755/72, and U.S. Pat. No. 3,856,758.

Further, the ring-opening polymerization product can be prepared in the presence of another catalyst system composed of oxides of tungsten and/or molybdenum (hereinafter referred to as "oxides"), for example, tungsten trioxide, molybdenum trioxide and Lewis acids, or of these oxides, Lewis acids and organic aluminium compounds at a temperature ranging from −50° C. to +150° C with or without an inert organic solvent.

The Lewis acids used as a catalyst component may by typically exemplified by aluminium chloride, tin tetrachloride, vanadium tetrachloride, and halogen-bearing organic aluminium compounds such as a dialkyl aluminium chloride and alkyl aluminium dichloride.

In order to prepare the ring-opening polymerization product, the Lewis acids are generally used in an amount of 0.1 to 10.0 mols, preferably 0.3 to 5.0 mols, per mole of the above-mentioned oxides. Further, where the catalytic system contains an organic aluminium compound, the aluminium compound is generally used in an amount of up to 10.0 moles, more preferably up to 5.0 moles per mole of the oxides.

Further, the ring-opening polymerization product may be prepared by directly charging the oxides and Lewis acids, or the oxides, Lewis acids and organic aluminium compounds, into a polymerization apparatus or by charging the apparatus with a product resulting from a reaction of the oxides with the Lewis acids, or a powder prepared by co-pulverizing the oxides and Lewis acids, or a mixture of the above reaction product or the powder and organic aluminium compounds.

Reaction between the oxides and Lewis acids can be effected at temperatures ranging from room temperature to 200° C with or without an inert organic solvent, with the proportion of the Lewis acids set at 0.1 to 10.0 mols, preferably 0.3 to 5.0 mols per mol of the oxides.

The components of these catalytic systems (A) and (B) may be added to a reaction system without pretreatment. Or it is possible to pretreat these components by pulverizing or copulverizing some or all of the catalytic components, heat or react the components or extract the heated or pulverized or copulverized catalytic components or reaction products thereof with a solvent and thereafter and the components thus treated to the reaction (ring-opening polymerization) system.

The object of the ring-opening polymerization can be fully attained, as previously described, by reacting norbornene derivatives or a mixture of the derivatives and unsaturated cyclic compounds in the presence of a catalyst system (A), (B) with or without an inert organic solvent. If desired, the molecular weight of the resultant polymer can be controlled by adding to the polymerization system α-olefins (preferably α-olefins having 2 to 12 carbon atoms) such as ethylene, propylene, butene-1 and hexene-1; internal olefins such as butene-2 and hexene-2; conjugated diolefins such as butadiene and isoprene or nonconjugated diolefins such as 1,4-hexadiene (preferably conjugated and nonconjugated diolefins having 4 to 10 carbon atoms). The suitable amount of the molecular weight controlling agent is not more than 500 parts by weight per 100 parts by weight of the monomer.

As previously mentioned, the polymer can be obtained by the ring-opening polymerization of the monomer in the presence of an inert organic solvent or in the absence of solvent (bulk polymerization). The inert organic solvent is preferably of the type which does not adversely affect the catalyst system and has a boiling point of 0° C to 250° C., preferably 25° to 200° C. Typical examples of the solvents are aliphatic hydrocarbons such as pentane, heptane, hexane, petroleum ether and decane; aromatic hydrocarbons such as benzene, toluene and xylene; alicyclic hydrocarbons such as cyclohexane, decalin and cyclooctane; halogenated hydrocarbons such as methylene chloride; 1,2-dichloroloethane, 1,1-dichloroethane, 1,2-dichloropropane, chloroform, chlorobenzene; and ethers such as diethyl ether and tetrahydrofuran.

The polymer obtained with any of the above-mentioned catalyst systems may be recovered from the reaction system, and the catalyst residue in the polymer may be removed from it. This can be accomplished, for example, in the following manner.

The solution resulting from the polymerization which contains the polymer, the unreacted monomer, the residual catalyst and inert organic solvent (if used) is poured into a relatively large amount of a lower alcohol such as methyl alcohol or ethyl alcohol, or the resulting solid (a non-flowable elastic matter in which the polymer obtained is swollen with the organic solvent) is thoroughly washed with the lower alcohol, whereby the catalyst residue is removed and at the same time, the resulting polymer is precipitated. However, the starting polymer used in the process of this invention may be one from which the lower alcohol used in the above procedure, the catalyst residue or the inert organic solvent have not been removed completely.

Homopolymers and copolymers containing the recurring units of formula (II) used as the starting polymers in this invention and processes for their preparation have been described above. These polymers are generally white to light brown powders having a degree of polymerization of about 10 to 10,000.

The present invention will be described in detail below.

A first embodiment of the present invention comprises hydrolyzing the starting polymers, i.e. the above homopolymer or copolymer containing the recurring units of formula (II), with acids to form corresponding homopolymers of copolymers containing the recurring units of formula (I).

A second embodiment of the present invention comprises hydrolyzing the starting polymer in the presence of a basic substance to form the corresponding homopolymer or copolymer containing recurring units of formula (I').

A third embodiment of the present invention comprises treating the polymer containing the recurring units of formula (I') containing positive ions, i.e. substituent M which is other than hydrogen, with an acid thereby to replace at least a part of the positive ions by a hydrogen atom.

The accompanying drawings are infrared absorption spectrum charts of certain starting polymers and of the polymers of this invention obtained by the above embodiments.

Preferred acids used for hydrolyzing the starting polymers in accordance with the first embodiment of this invention include hydrohalic acids, sulfuric acid, phosphoric acid, organic sulfonic acids containing 1 to 10 carbon atoms and carboxylic acids and halocarboxylic acids each containing 1 to 6 carbon atoms. These acids can be used either alone or in combination.

Typical examples of these acids are hydrochloric acid, sulfuric acid, phosphoric acid, benzenesulfonic acid, p-toluenesulfonic acid, methanesulfonic acid, acetic acid and trifluoroacetic acid.

Examples of suitable basic compounds used for hydrolyzing the starting polymers in accordance with the second embodiment of this invention are hydroxides, carbonates and bicarbonates of metals of Groups IA and IIA of the periodic table, and alkali metal salts of organic carboxylic acids containing 1 to 20 carbon atoms, each of which has a solubility of at least 0.1 g in 100 cc of water; and tertiary mono- and poly-amine compounds containing 3 to 20 carbon atoms. They can be used either alone or in combination.

Typical examples of the basic compounds are sodium hydroxide, potassium hydroxide, lithium hydroxide, barium hydroxide, lithium carbonate, sodium carbonate, potassium carbonate, sodium bicarbonate, potassium bicarbonate, sodium acetate, sodium propionate, sodium laurate, sodium phthalate, triethylamine, tri-n-butylamine, dimethyl-n-propylamine, N,N-dimethylcyclohexylamine and N,N-dimethylaniline.

The solubility of the basic compound other than tertiary amine compounds in 100 cc of water at the treating temperature is at least 0.1, preferably at least 0.2, especially preferably at least 0.5 g.

In the hydrolysis of the starting polymers with acids, the acids act as catalysts for hydrolyzing the acid anhydride linkage of the starting polymers. The degree of the reaction of the acids vary mainly according to the type and amount of the acid, the amount of water, and the treating temperature. Generally, it is dominated by the amount of water.

The amount of the acid is generally 0.01 to 250 equivalents, preferably 0.1 to 100 equivalents, more preferably 0.1 to 50 equivalents, per 100 equivalents of the acid anhydride linkage of the polymer. Even when the acid is used in an amount exceeding 250 equivalents per 100 equivalents of the acid anhydride linkage, the treating effect does not further increase, and moreover, troubles such as the occurrence of side-reactions or the difficulty of removing the acid used in the hydrolysis are caused. On the other hand, if the amount of the acid is less than 0.01 equivalent, there is no appreciable effect of using the acid.

The degree of hydrolysis can be controlled by changing the amount of water used, and in some case, water can be used as a reaction medium. Accordingly, water is used in an amount of at least 10 equivalents per 100 equivalents of the acid anhydride bond. Water in an amount of 10 to 100 equivalents is used to control the degree of the reaction, and water in an amount larger than 100 equivalents is useful as a reaction medium. There is no particular limit to the amount of water used, but from the economic standpoint, it is insignificant to use very great amounts of water, and generally, the amount of water is up to 100 parts by weight per part by weight of the starting polymer.

The acid hydrolyzing temperature is generally 0° to 150° C., preferably 0° to 100° C., more preferably 10° to 80° C. Temperatures above 150° C. are not desirable because side-reactions tend to occur. On the other hand, at a temperature of less than 0° C., the reaction is too slow to be of practical use.

This acid hydrolysis reaction can also be carried out in the presence of organic solvents which are not reactive with the acid and the starting polymers used. Typical examples of the organic solvents are n-hexane, benzene, toluene, xylene, 1,2-dichloroethane, tetrahydrofuran, dioxane and methylethylketone.

In the present invention, the amount of the basic compound to treat the starting polymer is generally 1.0 to 250 equivalents, preferably 1.0 to 200 equivalents, more preferably 50 to 160 equivalents, per 100 equivalents of the acid anhydride group of the starting polymer. If the amount of the basic compound is less than 1.0 equivalent per 100 equivalents of the acid anhydride group of the starting polymer, the starting polymer can scarcely be hydrolyzed. On the other hand, when the amount of the basic compound is more than 250 equivalents, side-reactions tend to occur, and such a large amount is not economically feasible.

The amount of water used in this reaction can be varied according to the extent to which this reaction is performed. But since it is also useful as a reaction medium, it is preferably used in an amount of at least 0.1 equivalent per 100 equivalents of the acid anhydride, and there is no particular upper limit. The use of very great amounts of water is insignificant from the economic standpoint, and furthermore, the recovery of the resulting alkali-treated product becomes troublesome. Generally, the amount of water is up to 100 times the weight of the starting polymer.

This hydrolysis in the presence of a basic compound may be carried out in the presence of an inert organic solvent, such as benzene, toluene, hexane and dioxane, and sometimes in the presence of alcohols such as methanol, ethanol and butanol.

The hydrolysis in the presence of a basic compound is generally carried out at a temperature of 0° to 200° C. The temperature can be varied according to the type and amount of the basic compound used, the type of the starting polymer and the degree of treatment of the polymer. Temperatures above 200° C. are not desirable because side-reactions tend to occur.

One example of performing the hydrolysis sufficiently using at least 2 equivalents, per equivalent of the acid anhydride group, of an alkali metal compound is schematically shown below:

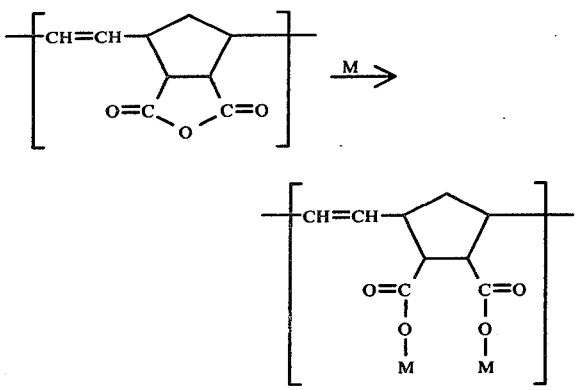

According to the third embodiment of this invention, the polymer containing the recurring units of formula (I') prepared in accordance with the second embodiment, i.e., the polymer containing the positive substituent M, is treated with acids to replace at least a part of the substituent M by a hydrogen atom. The degree of replacement by hydrogen can be controlled as desired according to the amount of the acid used, and this replacement can be effected easily. The properties of the resulting product, for example, solubility in water, can be varied according to the amount of the positive substituent M. Accordingly, a final product having the desired properties can be easily obtained by using the acid in an equivalent amount corresponding to the mole percent of the substituent M to be replaced by hydrogen, and this method is very convenient.

The various conditions used in the acid hydrolysis mentioned above can be applied to the above treatment with acids.

The final polymers of this invention obtained in accordance with the above embodiments have a degree of polymerization of about 10 to 10,000 corresponding to the starting polymer.

The polymers resulting from acid hydrolysis can be purified by sufficiently washing them with water to remove the acid completely, and then drying them. The polymers of this invention containing the recurring units of formula (I) generally have affinity for polar solvents, especially solvents having an electron-donating group. For Example, a polymer obtained by ring-opening polymerization of 2,6-methylene-1,2,3,6-tetrahydro-cis-phthalic anhydride, and hydrolyzing the resulting polymer completely with acids and having a relatively low molecular weight is soluble, for example, in dimethyl formamide, dimethyl sulfoxide, tetrahydrofuran, dioxane, pyridine and triethylamine. This polymer, when having a relatively high molecular weight, is soluble in or swellable with these solvents, completely soluble in methyl alcohol, but not soluble in 1,2-dichloroethane, methylene chloride, toluene, and n-hexane. Both of them have affinity for water, and are difficult to dry completely.

The properties of the polymers of this invention vary over a wide range depending upon the starting polymers. Generally, the polymers obtained in accordance with the first embodiment of this invention have a reduced viscosity, as measured in dimethyl formamide (concentration 0.2 g/dl) at 30° C., of 0.05 to 20.0. When the starting polymers are copolymers whose comonomer is the aromatic norbornene derivative or aromatic dimethanooctahydronaphthalene derivative, they are in the gelled state and insoluble in almost all organic solvents. Accordingly, products obtained by hydrolyzing these copolymers with acids in accordance with the process of this invention are also insoluble in nearly all organic solvents, and their reduced viscosities cannot be measured.

A typical example of the method of recovering the product obtained by hydrolysis in the presence of a basic substance in accordance with the second embodiment of this invention from the reaction system involves removing the water and organic solvent (if used) employed in the reaction by distillation. The distillation is performed preferably at reduced pressure. Another method comprises adding a well water-miscible organic solvent, such as methyl alcohol, acetone, dioxane, or tetrahydrofuran, to the reaction system to precipitate the resulting polymer, filtering the polymer, and washing it free of the unreacted basic compound. Methyl alcohol is the most suitable solvent used in this method.

The product so obtained is insoluble in ordinary organic solvents. When the copolymer is used as the starting polymer, the solubility of the final polymer in water differs mainly according to the type and proportion of the copolymer component, and the type of the basic compound used in the hydrolysis. When a homopolymer of 3,6-methylene-1,2,3,6-tetrahydrophthalic anhydride is treated with an aqueous solution of sodium hydroxide in the same equivalent amount as the acid anhydride group of the homopolymer is soluble in water.

The products obtained in accordance with the second embodiment of the present invention have reduced viscosities varying according to the starting polymers. Generally, they have a reduced viscosity, measured in a 1% by weight aqueous solution of sodium carbonate (concentration 0.2 g/dl) at 30° C., of 0.05 to 25.0. Some of these products, however, are insoluble in this solution.

The products obtained in accordance with the third embodiment of this invention generally have a reduced viscosity, measured in dimethyl formamide (concentration 0.2 g/dl) at 30° C., of 0.05 to 20.0. When the products are insoluble in dimethyl formamide, their reduced viscosity is measured in a 1% by weight aqueous solution of sodium carbonate (concentration 0.2 g/dl) at 30° C. The viscosities so measured are generally 0.05 to 25.0. When the starting polymer is a copolymer derived from bicyclo[2.2.1]-heptene-2, dimethanooctahydronaphthalene and the halogen-type norbornene derivative, the resulting product is frequently insoluble in organic solvents and water. In such a case, its reduced viscosity cannot be measured.

The final polymers obtained in accordance with the various embodiments of this invention are white or slightly yellow powders.

Since the final polymers obtained by the processes of this invention have a reactive double bond in their molecule, a monomer such as styrene, acrylonitrile or methyl methacrylate can be grafted to these polymers. By heating or using a cross-linking agent such as organic peroxides, these polymers can be cross-linked. Therefore these polymers can be used as heat- or UV-curable resins and paints. Furthermore, since the final polymers of this invention contain a carboxyl group and/or a carboxylate group in the side chain, they can be subjected to a polymer reaction with various compounds utilizing the carboxyl and/or carboxylate group.

Some of the final polymers containing a relatively large amount of a carboxylic acid salt (carboxylate group) are water soluble, and useful as polymeric flocculating agents or dispersing agents. Polymers containing a relatively large amount of carboxylate group (for example, a product obtained by treating a homo- or co-polymer of the acid anhydride-type norbornene derivative with alkalies almost completely) are difficult to fabricate (fabricate by heat), whereas polymers containing a relatively small amount of a carboxylate group (for example, a copolymeric product containing a relatively large quantity of the unsaturated cyclic compound or a product which has been incompletely treated with alkalies and still contains the untreated acid anhydride group) can be fabricated by known fabricating procedures for synthetic resins. The latter have very superior resistance to organic solvents.

The products obtained by this invention and containing a large quantity of a carboxyl group have superior adhesiveness, and can be used as adhesives to provide good metal-to-metal, metal-to-resin, metal-to-wood, and wood-to-resin bonds, for example. In particular, products obtained by hydrolyzing a copolymer derived from a polar group-containing norbornene derivative or ester-type norbornadiene derivative with acids have superior adhesiveness to metals such as aluminium and cellulosic materials such as paper and wood.

The final products obtained by the processes of this invention can be used either alone or in admixture with well miscible thermoplastic resins such as vinyl chloride polymers, styrene polymers, methyl methacrylate polymers, an acrylonitrile/styrene copolymer, an acrylonitrile/butadiene/styrene terpolymer (ABS resin), or a graft copolymer obtained by grafting acrylonitrile and styrene to chlorinated polyethylene, and/or an elastomer such as polybutadiene rubber, a styrene/butadiene copolymer rubber (SBR), an acrylonitrile/butadiene copolymer rubber (NBR), chlorinated polyethylene, chlorosulfonated polyethylene, acrylic rubbers, and chloroprene rubbers. Depending upon ultimate usages, additives generally used for synthetic resins, such as stabilizers against light (ultraviolet light), heat, oxygen and ozone, fire retardants, plasticizers, slipping agents, reinforcing agents, fillers, coloring agents (pigments), coloration improving agents, antistatic agents, or decomposition promotors, can be incorporated in the final polymers or their mixtures.

Many of the final products, especially copolymers, and their mixtures can be fabricated into various forms by conventional fabricating methods for synthetic resins such as compression molding, extrusion molding, injection molding, blow molding, or casting.

The final products of this invention have the above-mentioned advantages, and can be shaped into various forms by the conventional fabricating methods. Thus, they can be used in various application, for example, receptacles such as bottles, films, sheets, packaging materials, household goods, machine parts, pipes, or electric appliances in addition to the utilities already mentioned hereinabove.

The products of this invention obtained by acid hydrolysis of gell-like starting polymers can be used, for example, as ion-exchange resins, or fillers for liquid chromatography.

The following Examples illustrate the present invention in greater detail.

The reduced viscosities of polymers, referred to in the following examples, were measured at 30° C. in a concentration of 0.2 g/dl using (A) dimethyl formamide or (B) a 1.0% by weight of sodium carbonate or water, unless otherwise specified.

EXAMPLE 1

Preparation of Starting Polymer

A 10-liter stainless steel autoclave dried and purged with nitrogen was charged with 1.5 Kg of purified 3,6-methylene-1,2,3,6-tetrahydro-cis-phthalic anhydride (exo-type, 100%), 6 liters of 1,2-dichloroethane, and 233 ml. of a 1,2-dichloroethane solution containing 0.2 mole per liter of tungsten hexachloride and 0.6 mole per liter of acetaldehyde diethyl acetal (46 millimoles of tungsten hexachloride, 0.5 mol% based on the monomer), and then, the resulting reaction mixture was heated to 60° C. To the reaction mixture was further added 279 ml. of a toluene solution of diethyl aluminum chloride (concentration 1 mole/liter) (276 millimoles of diethyl aluminum chloride, 3.0 mol% based on the monomer). With stirring, the polymerization was performed for 2 hours. Then, the reaction mixture solidified almost completely to form an elastic material which was swollen with the solvent and devoid of flowability. The polymerization was continued at room temperature for an additional 18 hours. The polymer was then filtered, and pulverized. It was washed with about 10 liters of 1,2-dichloroethane, and dried at reduced pressure at 50° C. for 24 hours to afford 1.431 Kg of a light yellow brown polymer (polymerization conversion 95.3%). The resulting polymer was insoluble in methyl alcohol, ethyl alcohol, methylene chloride, 1,2-dichloroethane, tetrahydrofuran, dioxane, benzene, toluene, and hexane at a temperature of less than 80° C., swollen with N-methyl pyrrolidone and dimethyl sulfoxide, and was partly soluble in dimethyl formamide at 80° C.

Acid Hydrolysis 410 g of the polymer obtained by the process of this invention was finely divided in a mortar, and then placed in a 10-liter flask. About 5 liters of water was added. With stirring, 25 ml. of 1N hydrochloric acid was added, and the mixture was stirred at 30° C. for 48 hours. Then, the polymer was filtered, washed well with water, and dried at reduced pressure at 50° C. for about 20 hours. There was obtained 441 g of a white powdery polymer having a reduced viscosity (A) of 1.33. The polymer obtained was insoluble in hexane, toluene, methylene chloride, 1,2-dichloroethane and trichloroethylene at room temperature. However, it was swollen with isopropyl alcohol, acetone, dioxane, methyl ethyl ketone, pyridine and water at room temperature, partly soluble in tetrahydrofuran, and soluble at room temperature in methyl alcohol and dimethyl formamide.

The infrared absorption spectrum of the starting polymer showed an absorption based on the acid anhydride linkage at 1860 cm$^{-1}$ and 1780 cm$^{-1}$. But these absorptions disappeared in the hydrolyzed polymer, and a new absorption ascribable to a carboxyl group was seen at 2610 cm$^{-1}$ and 1730 cm$^{-1}$.

Figure 2:
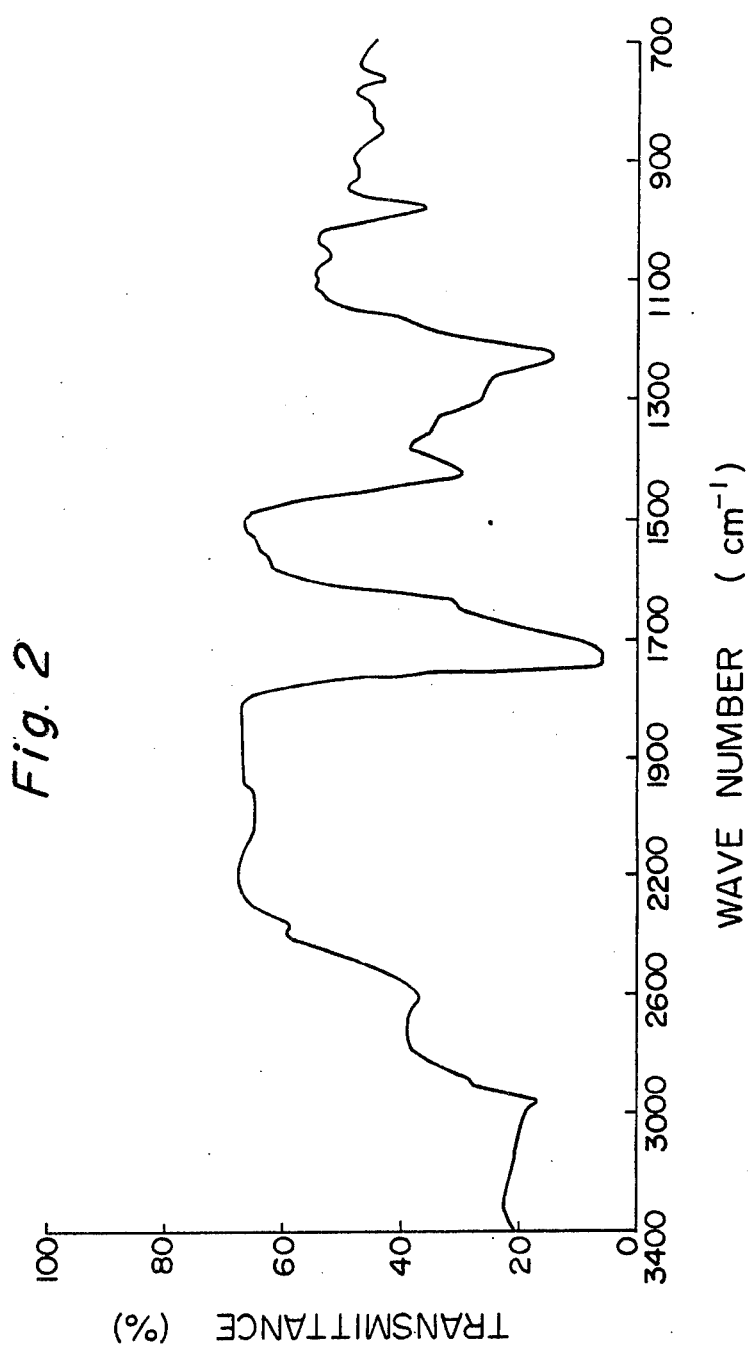

The infrared absorption spectra of the starting polymer and the acid hydrolyzed polymer obtained above are shown in FIGS. 1 and 2.

The above results demonstrate that the polymer obtained by hydrolyzing the starting polymer with hydrochloric acid contained a pendant carboxyl group as a result of hydration of the acid anhydride linkage in the side chain.

20 g of the hydrolyzed polymer obtained above was dissolved in 200 ml. of methyl alcohol to form a uniform solution. The solution was coated on one surface of a 0.08 mm-thick aluminum foil whose surface had been degreased with trichloroethylene, and was dried in the air for one day. Two aluminum foils so coated were superposed with the coated surfaces in contact with each other, and hot-pressed for 3 minutes at 200° C. at a pressure of 20 Kg/cm$^2$. The peel strength of the resulting plate in a direction of 180° was measured in accordance with ASTM D903–49 (the rate of pulling, 100 meters/minute). The peel strength was 12.8 Kg/2.5 cm. The peeled surface was caused by the cohesive failure of the resin.

It is clear from the above facts that the hydrolyzed product of a ring-opening polymerization product of the acid anhydride-type norbornene derivative had strong adhesion to aluminum.

In the same manner as above, a solution of the hydrolyzed polymer in methyl alcohol was coated on one surface of an aluminum foil and dried. A plate, 1 mm thick, of a ring-opened polymer of 5-cyano-bicyclo[2.2.1]heptene-2 was interposed between the coated surfaces of two aluminum foil specimens, and the assembly was hot-pressed at 200° C. and 30 Kg/cm$^2$. In the same manner as above, the peel strength of this composite plate was measured, and found to be 10.5 Kg/2.5 cm.

EXAMPLES 2 to 7

The polymer of 3,6-methylene-1,2,3,6-tetrahydro-cis-phthalic anhydride was pulverized and used as a starting polymer. The starting polymer was hydrolyzed with acids in the same way as in Example 1 except that each of the acids shown in Table 1 was used instead of hydrochloric acid, and the operation was performed on a 1/10 scale. The reduced viscosity of each of the hydrolyzed polymers obtained is shown in Table 1.

The solubility of the hydrolyzed polymers in various organic solvents and their infrared absorption spectra were determined in the same way. The results obtained were much the same as those obtained in Example 1.

Table 1

| Example | Acid Type | Amount | Reduced viscosity of the hydrolyzed polymer in solvent A |
|---|---|---|---|
| 2 | Sulfuric acid (1N) | 2.5 ml. | 1.32 |
| 3 | Phosphoric acid (1N) | 2.5 ml. | 1.33 |
| 4 | p-Toluenesulfonic acid | 0.430 g | 1.33 |
| 5 | Methanesulfonic acid | 0.240 g | 1.34 |
| 6 | Acetic acid | 0.190 g | 1.27 |
| 7 | Trifluoroacetic acid | 0.285 g | 1.36 |

EXAMPLE 8

A starting polymer was prepared in the same way as in Example 1 except that the acetaldehyde diethyl acetal as a third component of the catalyst was not used. The resulting polymer was purified (pulverized and washed) in the same way as in Example 1. As a result, 1.143 Kg (polymerization conversion, 72.5%) of a light yellowish brown polymer was obtained.

The resulting polymer was hydrolyzed with hydrochloric acid and purified in the same way as in Example 1 to afford 446 g of a white powdery polymer having a reduced viscosity (A) of 0.55. The solubility of the starting polymer in solvents was much the same as in Example 1. The hydrolyzed polymer was soluble in methyl alcohol, pyridine, tetrahydrofuran, dioxane, triethylamine and dimethyl formamide, and insoluble in hexane, toluene, methylene chloride and 1,2-dichloroethane. The infrared absorption spectra of the polymers were almost the same as those in Example 1.

EXAMPLE 9

The same starting polymer as used in Example 1 (82.0 g) was fully pulverized, and placed in a 1-liter flask. 800 ml. of water containing 44.0 g of sodium hydroxide was added, and the mixture was stirred at room temperature. In about 2 hours, the reaction mixture became a yellow uniform solution. It was reacted at room temperature for 2 hours with stirring. Water was then distilled off from the reaction mixture at reduced pressure, and the residue was dried at 60° C. under reduced pressure. As a result, 109.2 g of a polymer as a slightly yellow mass was obtained. The polymer had a reduced viscosity (B) of 1.43.

An infrared spectroscopic analysis of the resulting polymer showed that an absorption ascribable to the acid anhydride linkage at 1860 cm$^{-1}$ and 1780 cm$^{-1}$ disappeared, and a new absorption based on a carboxylate group appeared at 1590 cm$^{-1}$ and 1430 cm$^{-1}$. The hydrolyzed polymer was insoluble in methyl alcohol, ethyl alcohol, methylene chloride, 1,2-dichloroethane, tetrahydrofuran, dioxane, benzene, toluene, n-hexane, N-methyl pyrrolidone, dimethyl sulfoxide and dimethyl formamide, but soluble in water.

EXAMPLE 10

The starting polymer was treated with sodium hydroxide in the same way as in Example 9 except that the amount of the sodium hydroxide was changed to 20.0 g. Water was then distilled off from the reaction mixture, and dried under the same conditions as in Example 9. There was obtained 94.8 g of a polymer as a slightly yellow mass.

An infrared spectroscopic analysis of the hydrolyzed polymer showed that an absorption ascribable to the acid anhydride linkage at 1780 cm$^{-1}$ was slightly observed, and a carboxyl absorption at 1740 cm$^{-1}$ and a carboxylate absorption at 1590 cm$^{-1}$ and 1430 cm$^{-1}$ were observed.

The resulting polymer treated with sodium hydroxide was insoluble in methyl alcohol, ethyl alcohol, methylene chloride, 1,2-dichloroethane, tetrahydrofuran, dioxane, benzene, toluene, n-hexane, N-methylpyrrolidone, dimethyl sulfoxide, and dimethyl formamide, but soluble in water.

EXAMPLE 11

The starting polymer was treated in the same way as in Example 9 with 1.0 g of sodium hydroxide at 50° C. for 20 hours. A uniform solution was not obtained even after 20 hours, but the reaction mixture remained a suspension-like aqueous solution. Water was then distilled off from the reaction mixture and dried in the same way as in Example 9. There was obtained 83.1 g of a polymer as a slightly yellow powdery polymer.

The infrared absorption spectrum of the resulting polymer showed an absorption ascribable to the acid anhydride group slightly at 1780 cm$^{-1}$, and a strong carboxyl absorption at 1740 cm$^{-1}$.

The polymer was insoluble in methyl alcohol, ethyl alcohol, methylene chloride, 1,2-dichloroethane, tetrahydrofuran, dioxane, benzene, toluene, n-hexane, N-methyl pyrrolidone, dimethyl sulfoxide and dimethyl formamide, and water.

EXAMPLE 12

The same starting polymer as used in Example 9 was treated with sodium hydroxide in the same way as in Example 9. Then, with vigorous stirring, about 2 liters of methyl alcohol was gradually added to the resulting uniform solution to precipitate the hydrolyzed polymer. The polymer was separated by filtration, and washed with about 500 ml. of methyl alcohol. The purified product was dried at 50° C. for 20 hours at reduced pressure to afford 105.3 g of a white powdery polymer. The solubility of this polymer in the organic solvents and its infrared absorption spectrum were the same as those in Example 9.

Figure 3:
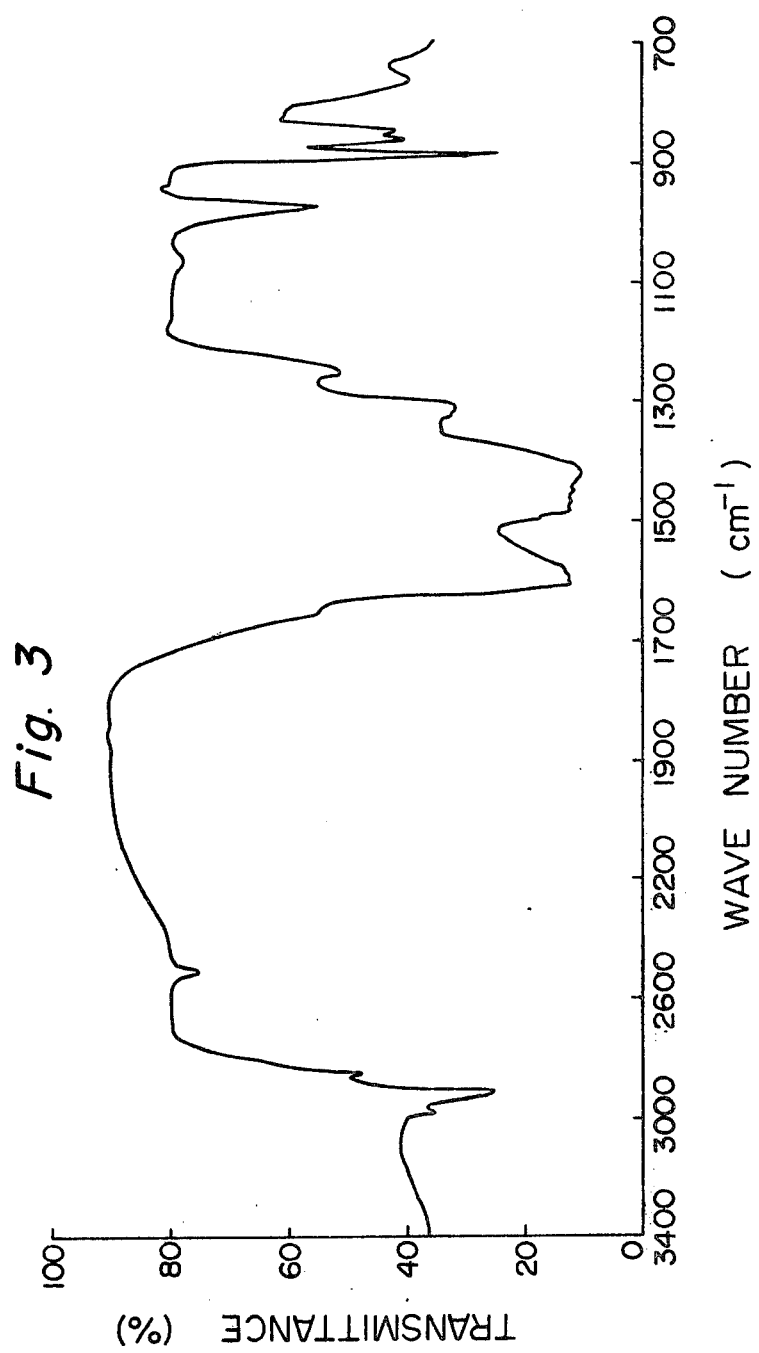

The infrared absorption spectrum of the resulting hydrolyzed product is shown in FIG. 3.

EXAMPLES 13 to 22

The same ring-opened polymer of 2,6-methylene-1,2,3,6-tetrahydro-cis-phthalic anhydride as used in Example 1 was treated with each of the basic compounds shown in Table 2 in a water medium. The treated product was separated and dried in the same way as in Example 12. In Examples 21 and 22, the products were separated in the same way as in Example 9. The type and amount of the basic compounds, the equivalent ratio of the basic compound to the acid anhydride group of the ring-opened polymer, the reduced viscosities of the hydrolyzed polymers and the form of the hydrolyzed polymers are shown in Table 2 below.

Table 2

| Ex. | Basic compounds Type | Amount (g) | Equivalent ratio | Reduced viscosity (B) | Form |
|---|---|---|---|---|---|
| 13 | Sodium carbonate | 58.5 | 1.1/1 | 1.43 | White powder |
| 14 | Sodium bicarbonate | 92.4 | 2.2/1 | 1.43 | " |
| 15 | Potassium hydroxide | 56.1 | 2.0/1 | 1.39 | " |
| 16 | Lithium hydroxide | 23.9 | 2.0/1 | 1.45 | " |
| 17 | Sodium acetate | 82.0 | 2.0/1 | 1.43 | " |
| 18 | Sodium propionate | 96.0 | 2.0/1 | 1.42 | " |
| 19 | Sodium laurate | 222.0 | 2.0/1 | 1.39 | " |
| 20 | Sodium phthalate | 105.0 | 1.0/1 | 1.40 | " |
| 21 | Triethylamine | 101.0 | 2.0/1 | 1.46 | " |
| 22 | Tri-n-butylamine | 92.5 | 1.0/1 | 1.48 | " |

EXAMPLE 23

113.0 g of the same sodium hydroxide-treated product as prepared in Example 9 was pulverized finely in a mortar, and placed in a 1-liter flask. About 1 liter of water was added, and with stirring, 1.2 liters of 1N-hydrochloric acid was added. The mixture was stirred at 30° C. for 48 hours. The polymer was filtered, and washed well with water. The resulting hydrochloric acid-modified product was dried at 50° C. for about 20 hours under reduced pressure. There was obtained 78.1 g of a white powdery polymer. The polymer had a reduced viscosity (A) of 1.35. The resulting polymer was not soluble in hexane, toluene, methylene chloride, 1,2-dichloroethane and trichloroethylene at room temperature. It was however swollen with isopropyl alcohol, acetone, dioxane, methyl ethyl ketone, pyridine and water at room temperature, partly soluble in tetrahydrofuran, and soluble in methyl alcohol and dimethyl formamide at room temperature.

An infrared spectroscopic analysis of the hydrochloric acid-modified product showed that a carboxylate absorption at 1590 cm$^{-1}$ and 1430 cm$^{-1}$ inherent to the sodium hydroxide-treated product disappeared, and a new carboxyl absorption was seen at 2610 cm$^{-1}$ and 1730 cm$^{-1}$.

It is clear from the results obtained that by reacting the ring-opened polymer of a norbornene derivative containing an acid anhydride linkage with a basic compound (sodium hydroxide), the acid anhydride linkage is converted to a carboxylate group (—COO), and by reacting the alkali-treated product with an acid, it is converted to a carboxyl group (—COOH). This shows that the polymer obtained by hydrolyzing the starting polymer in Example 1 directly with an acid by the method of Example 1 is substantially the same as the polymer obtained by hydrolyzing the starting polymer in the presence of alkali by the method of Example 23 and then treating the resulting product with an acid.

The hydrochloric acid-modified product of a ring-opened homopolymer of 3,6-methylene-1,2,3,6-tetrahydro-cis-phthalic anhydride obtained by the above method was dissolved in methyl alcohol in the same way as in Example 1. The resulting solution was coated on one surface of an aluminum foil, and dried in the same way as in Example 1. Two such aluminum foils were superposed with the coated surfaces in contact with each other, and the assembly was hot-pressed in the same way as in Example 1. The peel strength of the pressed plate was measured in the same way as in Example 1, and found to be 14.4 Kg/2.5 cm. The peeled surfaces were caused by the cohesive failure of the resin.

In the same way as above, a solution of the hydrochloric acid-modified product in methyl alcohol was coated on one surface of an aluminum foil and dried. A plate of a ring-opened homopolymer of 5-cyanobicyclo[2.2.1]-heptene-2 with a thickness of 1 mm was interposed between the coated surfaces of two such aluminum foil specimens, and the assembly was hot pressed at 200° C. and 30 Kg/cm². The peel strength of this composite plate was 12.6 Kg/2.5 cm.

When the acid-treated polymer was compression molded at 100 Kg/cm² and 260° C. for 10 minutes, a slightly yellow transparent plate could be formed.

EXAMPLE 24

A ring-opened polymer of 3,6-methylene-1,2,3,6-tetrahydro-cis-phthalic anhydride prepared in the same way as in Example 8 was treated with alkali, and the treated product was separated in the same way as in Example 12 (the operation was performed on a 10-fold scale). There was obtained 124 g of a white powdery polymer having a reduced viscosity (B) of 0.63. The solubility and infrared absorption spectrum of this polymer were the same as those obtained in Example 12.

EXAMPLE 25

A sodium hydroxide-treated polymer prepared in the same way as in Example 24 was treated with hydrochloric acid, and purified in the same way as in Example 23 to afford 79.4 g of a white powdery polymer having a reduced viscosity (A) of 0.59.

The acid-modified polymer was soluble in methyl alcohol, pryidine, tetrahydrofuran, dioxane, triethylamine and dimethyl formamide, but insoluble in hexane, toluene, methylene chloride and 1,2-dichloroethane.

The infrared absorption spectra of the ring-opened polymer, the sodium hydroxide-treated polymer, and the hydrochloric acid-modified polymer were almost the same as those obtained in Example 23.

EXAMPLES 26 to 31

A sodium hydroxide-treated polymer obtained in the same way as in Example 9 was acid-modified in the same manner as in Example 24 except that each of the acids shown in Table 3 was used instead of the hydrochloric acid. The reduced viscosities of the acid-modified polymers obtained are shown in Table 3.

The solubilities of the acid-modified polymers in various organic solvents and their infrared absorption spectra were much the same as those in Example 24.

Table 3

| | Acid | | Reduced viscosity of the acid-modified polymer *4) |
|---|---|---|---|
| Example | Type | Amount | |
| 26 | Sulfuric acid (1N) | 1.2 l | 1.48 |
| 27 | Phosphoric acid (1N) | 1.2 l | 1.48 |
| 28 | p-Toluenesulfonic acid *1) | *1) | 1.48 |
| 29 | Methanesulfonic acid *2) | *2) | 1.47 |
| 30 | Acetic acid | 120 g | 1.46 |
| 31 | Trifluoroacetic acid *3) | *3) | 1.48 |

*1) A mixture of 7.5 g of p-toluenesulfonic acid and 990 ml. of hydrochloric acid (1N).
*2) A mixture of 4.8 g of methanesulfonic acid and 990 ml. of hydrochloric acid (1N).
*3) A mixture of 5.7 g of trifluoroacetic acid and 990 ml. of hydrochloric acid (1N).
*4) Solvent A

EXAMPLES 32 to 41

Alkali treatment was performed in the same way as in Example 12 except that each of the basic compounds shown in Table 4 was used instead of the sodium hydroxide. Each of the alkali-treated products was treated with 1N hydrochloric acid in the same way as in Example 23. The resulting hydrochloric acid-modified products were each purified in substantially the same manner as in Example 23. The types and amounts of the basic compounds used, the equivalent ratio of the basic compound to the acid anhydride group of the ring-opened polymer, and the reduced viscosities of the alkali-treated products and the hydrochloric acid-modified products are shown in Table 4.

The solubility of each of the acid-modified products in organic solvents and its infrared absorption spectrum were found to be almost the same as those in Example 23.

Table 4

| | Basic compounds | Amount | Equivalent | Reduced viscosities | |
|---|---|---|---|---|---|
| Examples | Type | (g) | ratio *1) | Alkali-treated product *2) | Hydrochloric acid-modified product *3) |
| 32 | Sodium carbonate | 58.5 | 11./1 | 1.52 | 1.36 |
| 33 | Sodijm bicarbonate | 92.4 | 2.2/1 | 1.50 | 1.35 |
| 34 | Potassium hydroxide | 56.1 | 2.0/1 | 1.46 | 1.34 |
| 35 | Lithium hydroxide | 23.9 | 2.0/1 | 1.47 | 1.35 |
| 36 | Sodium acetate | 82.0 | 2.0/1 | 1.44 | 1.35 |
| 37 | Sodium propionate | 96.0 | 2.0/1 | 1.45 | 1.35 |
| 38 | Sodium laurate | 222.0 | 2.0/1 | 1.44 | 1.36 |
| 39 | Sodium phthalate | 105.0 | 1.0/1 | 1.44 | 1.37 |
| 40 | Triethylamine | 101.0 | 2.0/1 | 1.46 | 1.35 |

Table 4-continued

| Examples | Basic compounds Type | Amount (g) | Equivalent ratio *1) | Reduced viscosities Alkali-treated product *2) | Hydrochloric acid-modified product *3) |
|---|---|---|---|---|---|
| 41 | Tri-n-butylamine | 92.5 | 1.0/1 | 1.48 | 1.36 |

*1) Equivalent ratio of the basic compound/the acid anhydride group of the ring-opened polymer
*2) Temperature 30° C., concentration 0.1 g/dl, solvent B
*3) Temperature 30° C., concentration 0.1 g/dl, solvent A

EXAMPLES 42 to 45

Ring-opening polymerization was performed under the same conditions as in Example 1 except that each of 5-(5-carboxy-bicyclo[2.2.1]-hept-2-enyl) acetic anhydride (to be referred to as "monomer A"), 3,6-methano-1-methyl-1,2,3,6-tetrahydro-cis-phthalic anhydride (to be referred to as "monomer B"), 5,8-methano-1,2,3,4,4a,5,8,8a-octahydronaphthalene-1,2-dicarboxylic anhydride (to be referred to as "monomer C"), and 1,4,5,8-dimethano-1,2,3,4,4a,5,8,8a-octahydronaphthalene-2,3-dicarboxylic anhydride (to be referred to as "monomer D") was used instead of the 3,6-methylene-1,2,3,6-tetrahydro-cis-phthalic anhydride (0.5 mole % of tungsten hexachloride, 1.5 mole% of acetaldehyde diethylacetal, and 3.0 mole% of diethylaluminum chloride based on the monomer). After the polymerization, each of the products was purified in the same way as in Example 1. Each of the purified starting polymers was hydrolyzed with hydrochloric acid under the same conditions as in Example 1. The polymerization conversions in the preparation of the polymers and the reduced viscosities of the hydrolyzed polymers are shown in Table 5.

An infrared spectroscopic analysis of the ring-opened polymers and the acid-hydrolyzed polymers showed that an absorption ascribable to the acid anhydride group was seen in the ring-opened polymers, but this absorption disappeared in the acid-treated polymers and a new carboxyl absorption was observed.

Table 5

| Examples | Monomers | Polymerization conversion (%) | Reduced viscosity of the hydrolyzed polymer (solvent A) |
|---|---|---|---|
| 42 | A | 40.9 | 0.61 |
| 43 | B | 53.9 | 0.57 |
| 44 | C | 50.1 | 0.59 |
| 45 | D | 62.8 | 0.43 |

EXAMPLES 46 to 49

Each of the ring-opened polymers used in Examples 42 to 45 (to be referred to as "polymer A", "polymer B", "polymer C", and "polymer D") in an amount of 0.5 equivalent (based on the acid anhydride group of the ring-opened polymer) was treated with sodium hydroxide in the same way as in Example 9. After distilling off water at reduced pressure from the reaction mixture, the treated product was dried at reduced pressure in the same way as in Example 9. The reduced viscosities of the treated products, measured in water, are shown in Table 6.

Table 6

| Examples | Polymers | Reduced viscosity |
|---|---|---|
| 46 | A | 0.69 |
| 47 | B | 0.62 |
| 48 | C | 0.66 |
| 49 | D | 0.58 |

The sodium hydroxide-treated products were all insoluble in methyl alcohol, ethyl alcohol, methylene chloride, 1,2-dichloroethane, tetrahydrofuran, dioxane, benzene, toluene, n-hexane, N-methyl pyrrolidone, dimethyl sulfoxide and dimethyl formamide.

The infrared absorption spectra of these sodium hydroxide-treated products all showed several carboxylate absorptions at 1400 to 1600 cm$^{-1}$ while the absorption ascribable to the acid anhydride linkage at 1700 to 1900 cm$^{-1}$ disappeared.

EXAMPLES 50 to 53

Each of the alkali-treated products obtained in Examples 46 to 49 (to be referred to as "treated product A", "treated product B", "treated product C", and "treated product D") was treated with hydrochloric acid, and then purified in the same way as in Example 23. The reduced viscosities (in dimethyl formamide at 30° C. in a concentration of 0.1 g/dl) of the acid-modified products are shown in Table 7.

The infrared absorption spectra of these acid-modified products showed a new carboxyl absorption at 2160 and 1730 cm$^{-1}$ but did not contain carboxylate absorptions at 1400 to 1600 cm$^{-1}$ which had been observed in the sodium hydroxide-treated products.

Table 7

| Example | Treated product | Viscosity of hydrochloric acid-modified product |
|---|---|---|
| 50 | A | 0.60 |
| 51 | B | 0.59 |
| 52 | C | 0.54 |
| 53 | D | 0.48 |

EXAMPLE 54

82.0 g of the same starting ring-opened polymer as used in Example 9 was added to 1.0 liter of an aqueous solution containing 85.7 g of barium hydroxide, and reacted at 80° C. for 20 hours.

After 20 hours, a uniform solution was not obtained, but the reaction mixture remained a suspension-like aqueous solution. The barium hydroxide-treated product was separated from the suspension-like aqueous solution, and washed thoroughly with warm water at 50° C. until no barium ion was detected in the filtrate. The purified product was fully dried at 60° C. under reduced pressure. As a result, 98.2 g of a slightly yellow powdery polymer was obtained.

The infrared absorption spectrum of the alkali-treated polymer showed an absorption ascribable to the acid anhydride group at 1780 cm$^{-1}$, a carboxyl absorption at 1740 cm$^{-1}$, and a carboxylate absorption at 1400 to 1600 cm$^{-1}$. This polymer was insoluble not only in water, but also in the organic solvents used in the solubility test in Example 9.

EXAMPLE 55

The barium hydroxide-treated product obtained in Example 54 was pulverized finely in a mortar, and placed in a 2-liter flask. Then about 600 ml. of water was added. With stirring, 600 ml. of 2N hydrochloric acid was added. The mixture was stirred at 30° C. for 5 hours, and the resulting polymer was filtered and washed well with water. The resulting hydrochloric acid-modified product was dried at 50° C. under reduced pressure for about 20 hours. There was obtained 83.6 g of a white powdery polymer.

The methanol-soluble portion of the resulting polymer (hydrochloric acid-modified product) had a reduced viscosity (A) of 1.40.

The solubility of the hydrochloric acid-modified polymer in various organic solvents and its infrared absorption spectrum were much the same as those in Example 1. The methanol-insoluble portion of this polymer was not soluble in ordinary organic solvents. The methanol-insoluble portion showed much the same infrared absorption spectrum as the methanol-soluble portion.

EXAMPLE 56

A 10-liter vessel dried and thoroughly purged with nitrogen was charged with 1500 g of a mixture of 3,6-methylene-1,2,3,6-tetrahydro-cis-phthalic anhydride (exo-type 100%) (to be referred to as "monomer (I)") and 5-cyano-bicyclo(2.2.1)-heptene-2 (to be referred to as "monomer (II)") in a mole ratio of 75:25, 6 liters of 1,2-dichloroethane, and 246 ml. of a 1,2-dichloroethane solution of tungsten hexachloride and acetaldehyde diethyl acetal (the concentration of tungsten hexachloride 0.2 mole/liter, 3 moles of acetaldehyde diethyl acetal per mole of tungsten hexachloride; 49 millimoles of tungsten hexachloride corresponding to 0.5 mole% based on the monomer). The reaction mixture was heated to 60° C., and thoroughly stirred to form a uniform solution. A toluene solution of diethyl aluminum chloride (1 mole/liter of the diethyl aluminum chloride; 294 millimoles of diethyl aluminum chloride corresponding to 3 mole% of the total amount of the monomers) was added in an amount of 295 ml. to the resulting solution. With stirring, the polymerization was performed for 2 hours. Then, the reaction was further continued at room temperature for 18 hours. The reaction mixture was a brown non-transparent solid. The solid was pulverized, washed thoroughly with methyl alcohol, and dried at 50° C. under reduced pressure for 24 hours. There was obtained 1474 g of a light yellowish white polymer. The polymerization conversion was 98.0%.

This polymer was not soluble in methyl alcohol, toluene and hexane, partly soluble in 1,2-dichloroethane, methylene chloride and chloroform, and completely soluble in hot dimethyl formamide kept at 80° C.

A ring-opened homopolymer of monomer (I) was partialy soluble in hot dimethyl formamide but insoluble in 1,2-dichloroethane (see Example 1). On the other hand, a ring-opened homopolymer of monomer (II) was completely soluble in 1,2-dichloroethane and dimethyl formamide. In contrast, the ring-opened copolymer obtained above was soluble only partly in 1,2-dichloroethane and dimethyl formamide, and mostly swollen with it. However, this copolymer was soluble completely in hot dimethyl formamide. An infrared spectroscopic analysis of the ring-opened copolymer showed that there were a nitrilo absorption at 2245 cm$^{-1}$ and an acid anhydride group absorption at 1700 to 1800 cm$^{-1}$ both in the 1,2-dichloroethane-soluble and insoluble parts of the copolymer. This fact demonstrates that a copolymer of the monomers (I) and (II) was obtained.

38.2 g of the resulting copolymer was finely divided, and placed in a 500 ml. flask. 300 ml. of water and 2.5 ml. of 1N hydrochloric acid was added. The mixture was stirred at 30° C. for 48 hours. Then, the polymer obtained was separated by filtration, washed well with water, and dried at reduced pressure at 50° C. for 20 hours. There was obtained 41.6 g of slightly yellow polymer having a reduced viscosity (A) of 2.85. The infrared absorption spectrum of the hydrochloric acid-modified polymer showed a strong nitrilo absorption at 2245 cm$^{-}_{1}$ and a strong carboxyl absorption at 1730 and 2610 cm$^{-1}$, whereas the acid anhydride absorption present at 1700 to 1800 cm$^{-1}$ in the copolymer before the acid treatment disappeared. From this, it was ascertained that the hydrolysis of the acid anhydride linkage occurred by the hydrochloric acid treatment.

EXAMPLE 57

38.2 g of the ring-opened copolymer used in Example 56 was finely divided, and placed in a 500 ml. flask. 300 ml. of water and 16.5 g of sodium hydroxide were added, and the mixture was stirred at 30° C. for 20 hours. After the reaction, the reaction mixture was a uniform aqueous solution. With vigorous stirring, 1 liter of methyl alcohol was gradually added to the aqueous solution to precipitate the sodium hydroxide-treated product. The precipitate was separated by filtration, and dried under reduced pressure at 50° C. for 20 hours. There was obtained 38.7 g of a white powdery polymer. The polymer (alkali-treated product) had a reduced viscosity in water of 3.09.

Figure 4:
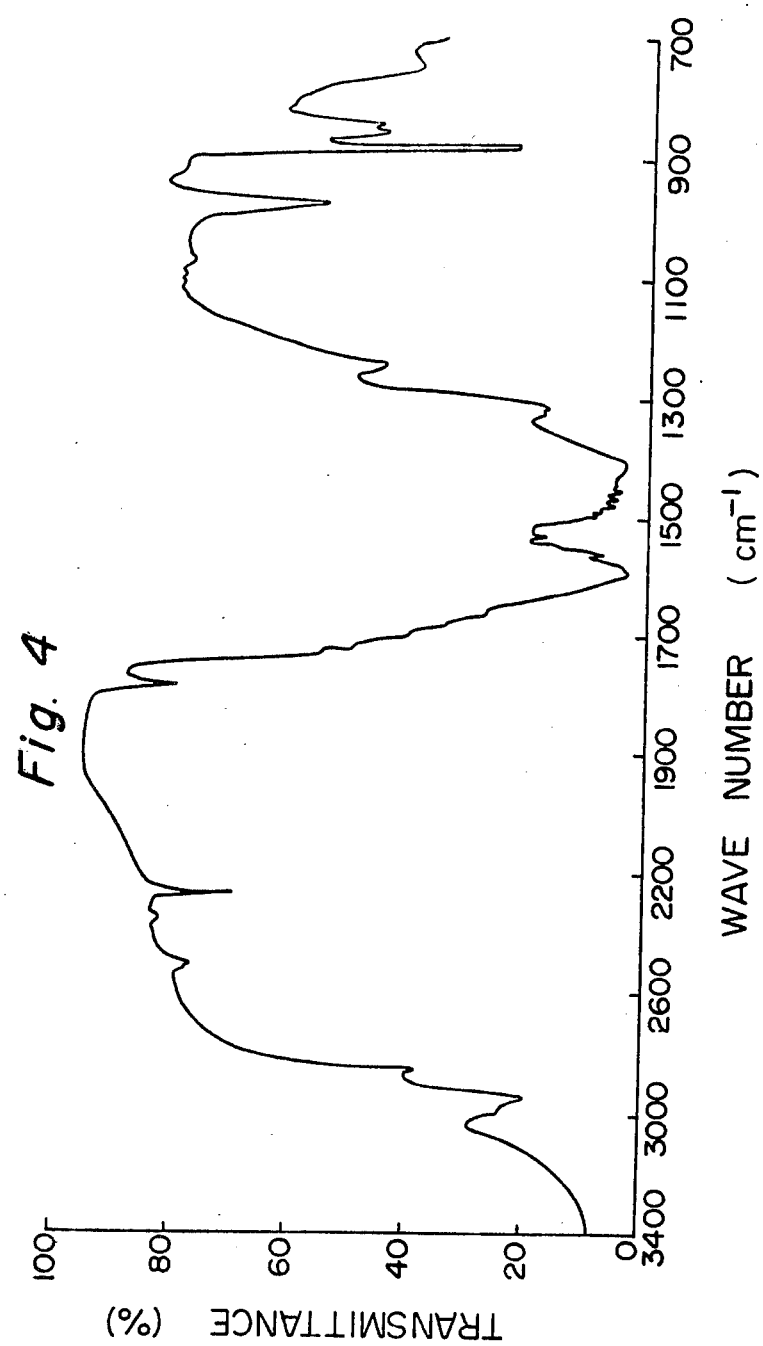

The infrared absorption spectrum of the sodium hydroxide-treated product showed a sharp cyano absorption at 2245 cm$^{-}$, and a carboxylate absorption at 1400 to 1600 cm$^{-1}$, but the acid anhydride absorption at 1700 to 1860 cm$^{-1}$ present in the polymer before the treatment with sodium hydroxide substantially disappeared. The spectrum of the resulting polymer is shown in FIG. 4.

EXAMPLE 58

100.0 g of the same sodium hydroxide-treated product as obtained in Example 57 was finely divided and placed in a 3-liter flask. 1.0 liter of water was further added to dissolve the polymer completely. Then, 800 ml. of 1N hydrochloride acid was added. The mixture was stirred at 30° C. for 48 hours. The polymer was separated by filtration, washed well with water, and dried under reduced pressure at 50° C. for 20 hours. There was obtained 74.4 g of a slightly yellow polymer having a reduced viscosity of 2.90.

The infrared absorption spectrum of this polymer showed a sharp cyano absorption at 2245 cm$^{-1}$, and a new strong carboxyl absorption at 1730 and 2610 cm$^{-1}$, whereas the carboxylate absorption at 1400 to 1600 cm$^{-1}$ present in the polymer before the acid treatment disappeared. It was ascertained from the above that the hydrolysis of the acid anhydride linkage occurred as a result of the treatment with the aqueous alkali solution, and that the carboxylate was neutralized by the acid treatment to carboxyl.

EXAMPLE 59

The same reaction as in Example 56 was performed except that 1500 g of a mixture of monomers (I) and (II) in a mole ratio of 50:50 was used instead of the monomeric mixture used in Example 56 to prepare the ring-opened copolymer, and the amounts of the 1,2-dichloroethane solution of tungsten hexachloride and acetaldehyde diethyl acetal and the toluene solution of diethyl aluminum chloride used in Example 56 were changed so that the proportions of tungsten hexachloride and diethyl aluminum chloride were 0.5 mole % and 1.5 mole %, respectively, based on the total amount of the monomeric mixture. At the end of the reaction, the reaction mixture was brown and solidified. The resulting polymer was pulverized, and purified in the same way as in Example 56. There was obtained 1404 g of a light yellow polymer. The polymerization conversion was 93.6%.

The solubility of this polymer was almost the same as that of the ring-opened copolymer obtained in Example 56. The infrared absorption spectrum of this polymer was substantially the same as that obtained in Example 56, although there was some difference in the intensity of the characteristic absorptions.

35.4 g of the copolymer obtained above was pulverized finely, and treated with hydrochloric acid and also purified in the same way as in Example 56. There was obtained 37.2 g of a slightly yellow polymer having a reduced viscosity (A) of 3.16.

The resulting acid-modified polymer was soluble in dimethyl formamide and pyridine, but insoluble in n-hexane and toluene.

Figure 5:
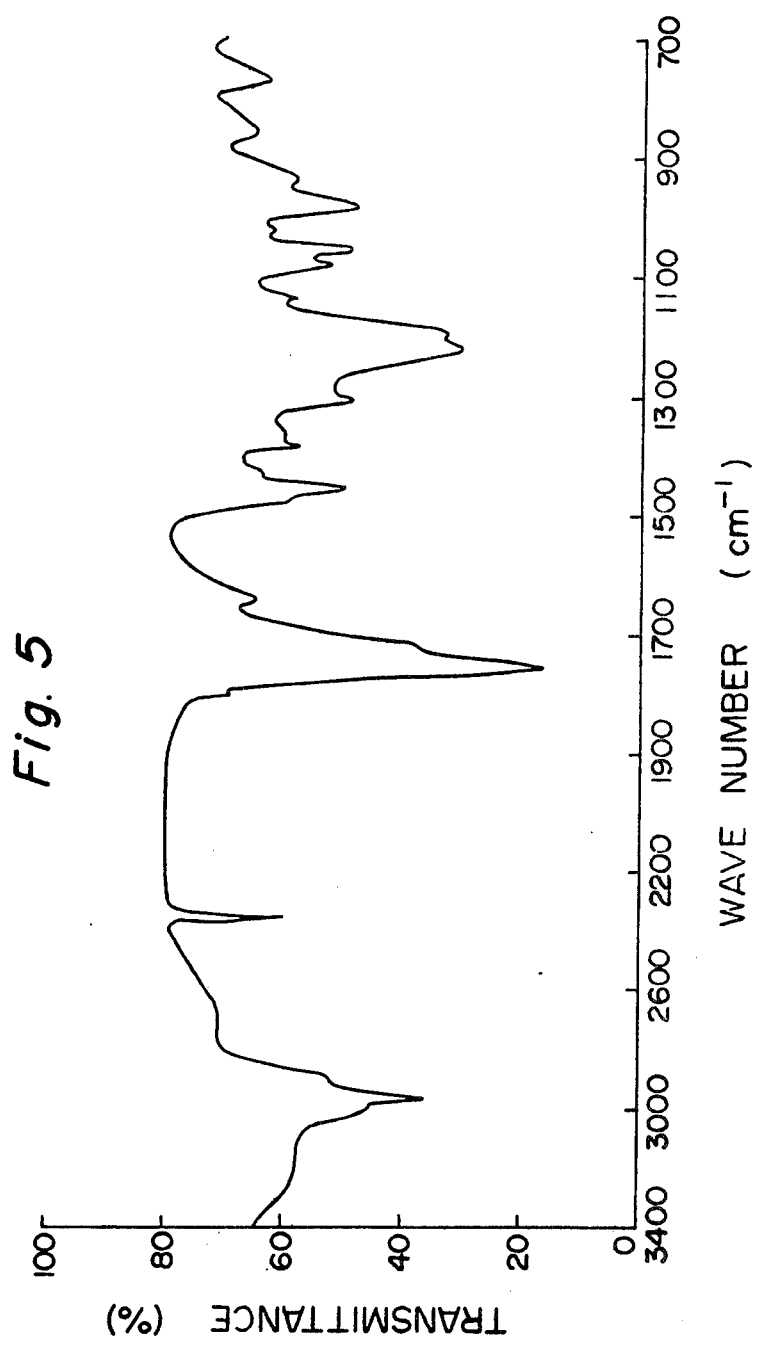

The infrared absorption spectrum of the hydrochloric acid-treated product obtained above was substantially the same as that obtained after acid-treatment in Example 56, although there was some increase in the strength of the cyano absorption. This infrared absorption spectrum is shown in FIG. 5.

EXAMPLE 60

35.4 g of the starting ring-opened copolymer obtained in Example 59 was finely pulverized, and placed in a 500 ml. flask. 300 ml. of water and 11.0 g of sodium hydroxide were added, and the mixture was stirred at 30° C. for 20 hours. At the end of the reaction, the reaction mixture was a uniform aqueous solution. With vigorous stirring, 1 liter of methyl alcohol was gradually added to the aqueous solution to precipitate the sodium hydroxide-treated-product. The precipitate was separated by filtration, and dried under reduced pressure at 50° C. for 20 hours. There was obtained 38.8 g of a white powdery polymer having a reduced viscosity in water of 3.33.

The infrared absorption spectrum of the resulting alkali-treated product showed a sharp cyano absorption at 2245 $cm^{-1}$ and several carboxylate absorptions at 1600 to 1400 $cm^{-1}$, whereas the acid anhydride absorption present at 1700 to 1860 $cm^{-1}$ in the polymer before the treatment with sodium hydroxide substantially disappeared.

EXAMPLE 61

The same alkali-treated product as prepared in Example 60 was treated with hydrochloric acid, and then purified in the same way as in Example 58. As a result, there was obtained 68.1 g of a slightly yellow polymer from 86.3 g of the alkali-treated product. The acid-modified polymer had a reduced viscosity (A) of 3.18.

The hydrochloric acid-modified polymer was soluble in dimethyl formamide and pyridine, but insoluble in n-hexane and toluene. The infrared absorption spectrum of the resulting hydrochloric acid-modified product was much the same as that of the acid-modified product obtained in Example 59.

EXAMPLE 62

The same reaction as in Example 56 was performed except that 1500 g of a mixture of monomers (I) and (II) in a mole ratio of 15:85 was used, and the amounts of the 1,2-dichloroethane solution of tungsten hexachloride and acetaldehyde diethyl acetal and the toluene solution of diethyl aluminum chloride used in Example 56 were changed so that the proportions of tungsten hexachloride and diethyl aluminum chloride were 0.5 mole % and 1.5 mole % respectively based on the total amount of the monomeric mixture. At the end of the reaction, the reaction mixture was brown and solidified (not turbid). The resulting polymer was pulverized, and purified in the same way as in Example 56. As a result, there was obtained 1382 g of a light yellow polymer. The polymerization conversion was 92.1%.

The resulting polymer was partly soluble in 1,2-dichloroethane, chloroform and methylene chloride, but completely soluble in hot dimethyl formamide held at 80° C. The infrared absorption spectrum of the polymer was much the same qualitatively as that obtained in Example 56.

31.4 g of the copolymer obtained above was finely pulverized, treated with hydrochloric acid, and purified in the same way as in Example 56. As a result, there was obtained 32.0 g of a slightly yellow polymer having a reduced viscosity (A) of 3.02.

The resulting polymer was soluble in dimethyl formamide, pyridine and tetrahydrofuran.

EXAMPLE 63

3.14 g of the ring-opened copolymer used in Example 62 was finely pulverized and placed in a 5-liter flask. 3.0 liters of water and 33 g of sodium hydroxide were added, and the mixture was stirred at 30° C. for 20 hours. At the end of the reaction, the reaction mixture did not become a uniform solution. With vigorous stirring, 1 liter of methyl alcohol was gradually added to the reaction mixture to precipitate the sodium hydroxide-treated product. The precipitate was separated by filtration, and dried under reduced pressure at 50° C. for 20 hours. There was obtained 327 g of a slightly yellow powdery polymer. This polymer was insoluble in water.

The infrared absorption spectrum of the sodium hydroxide-treated product showed a strong cyano absorption at 2245 $cm^{-1}$, and several carboxylate absorptions at 1600 to 1400 $cm^{-1}$. But the acid anhydride absorption present at 1700 to 1860 $cm^{-1}$ in the polymer before the treatment with sodium hydroxide substantially disappeared.

EXAMPLE 64

The same polymer (the sodium hydroxide-treated product) as obtained in Example 63 was treated with hydrochloric acid, and purified in the same way as in Example 58. There was obtained 127.0 g of a slightly yellow polymer from 135.0 g of the alkali-treated product. The hydrochloric acid-modified polymer had a reduced viscosity (A) of 3.01.

The infrared absorption spectrum of the hydrochloric acid-modified polymer showed a strong carboxyl absorption at 1730 cm$^{-1}$. The polymer was soluble in dimethyl formamide, pyridine and tetrahydrofuran.

EXAMPLE 65

The same reaction as in Example 56 was performed except that 1500 g of a mixture of monomers (I) and (II) in a mole ratio of 2:98 was used instead of the monomeric mixture used in Example 56, and the amounts of the 1,2-dichloroethane solution of tungsten hexachloride and acetaldehyde diethyl acetal and the toluene solution of diethyl aluminum chloride were changed so that the proportions of tungsten hexachloride and diethyl aluminum chloride became 0.5 mole % and 1.5 mole % respectively based on the total amount of the monomeric mixture. At the end of the reaction, the reaction mixture was brown and solidified (not turbid). The resulting polymer was pulverized and purified in the same way as in Example 56. There was obtained 1388 g of a light yellow polymer. The polymerization conversion was 92.5%. The polymer was partly soluble in methylene chloride, chloroform and 1,2-dichloroethane, but completely soluble in hot dimethyl formamide.

30.0 g of the starting copolymer so obtained was finely pulverized, and treated with hydrochloric acid and purified in the same way as in Example 56. There was obtained 29.8 g of a slightly yellow polymer having a reducd viscosity (A) of 4.90.

The infrared absorption spectrum of the product was much the same as that of the hydrochloric acid-treated product obtained in Example 56, but showed a slight carboxyl absorption. The polymer was soluble in dimethyl formamide, pyridine and tetrahydrofuran.

EXAMPLE 66

300 g of the same ring-opened copolymer as used in Example 65 was pulverized sufficiently, and placed in a 5-liter flask. 3.0 liters of water and 5.0 g of sodium hydroxide were added, and the polymer was treated with sodium hydroxide in the same way as in Example 9. At the end of the reaction, the reaction mixture did not become a uniform solution, but remained a suspension. After the reaction, the alkali-treated product was separated and dried in the same way as in Example 63. There was obtained 298 g of a slightly yellow powdery polymer.

The infrared absorption spectrum of the resulting sodium hydroxide-treated product showed a strong cyano absorption at 2245 cm$^{-1}$ and was similar to that of a ring-opened homopolymer of 5-cyano-bicyclo[2.2.1]-heptane-2 (see Japanese Laid-Open Patent Publication No. 100500/73).

The sodium hydroxide-treated products obtained in Examples 57, 60 and 63 were insoluble in methyl alcohol, ethyl alcohol, methylene chloride, 1,2-dichloroethane, tetrahydrofuran, dioxane, benzene, toluene, n-hexane, N-methyl pyrrolidone, methyl sulfoxide and dimethyl formamide. On the other hand, the sodium hydroxide-treated product obtained in Example 66 was swollen with methyl alcohol and dimethyl formamide, but insoluble in the other organic solvents mentioned above and water.

EXAMPLE 67

The same sodium hydroxide-treated product as obtained in Example 66 was treated with hydrochloric acid and purified in the same way as in Example 58. There was obtained 115.9 g of a slightly yellow polymer from 121.1 g of the alkali-treated product. The hydrochloric acid-modified polymer had a reduced viscosity (A) of 5.04.

The infared absorption spectrum of the resulting hydrochloric acid-modified polymer was much the same as that of the hydrochloric acid-modified polymer obtained in Example 65, but showed a slight carboxyl absorption. The polymer obtained was soluble in dimethyl formamide, pyridine and tetrahydrofuran.

EXAMPLE 68

The same polymerization as in Example 59 was performed except that 5-methyl-5-methoxycarbonyl-bicyclo-[2.2.1]-heptene-2 was used in an equimolar proportion to the monomer (I) instead of the monomer (II) in the monomeric mixture. At the end of the reaction, the reaction mixture was turbid and solidified. The reaction mixture was post-treated in the same way as in Example 59 to afford 1418 g of a light yellow polymer. The polymerization conversion was 94.5%.

1.0 g of this polymer was taken, and 10 ml. of 1,2-dichloroethane was added. When the mixture was allowed to stand at room temperature, an insoluble portion occurred. The insoluble portion was filtered. 50 ml. of methyl alcohol was added to the filtrate to reprecipitate the polymer. The soluble portion was separated from the insoluble portion. Each of these portions was dried under reduced pressure at 50° C. for 20 hours. The soluble portion weighed 0.913 g (91.3%), and the insoluble portion weighed 0.078 g (7.8%).

The infrared absorption spectra of the soluble and insoluble polymers both showed overlapping absorptions at 1700 to 1860 cm$^{-1}$ ascribable to the ester and the carbonyl of the acid anhydride. (There was some difference, but the difference was not significant.) Both of these polymers were insoluble in n-hexane and toluene, but completely soluble in hot dimethyl formamide.

400 g of the above polymer (before separation into the soluble and insoluble portions) was pulverized fully, and treated with hydrocholoric acid and post-treated in the same way as in Example 56. There was obtained 41.9 g of a slightly yellow polymer having a reduced viscosity (A) of 2.49.

Figure 6:
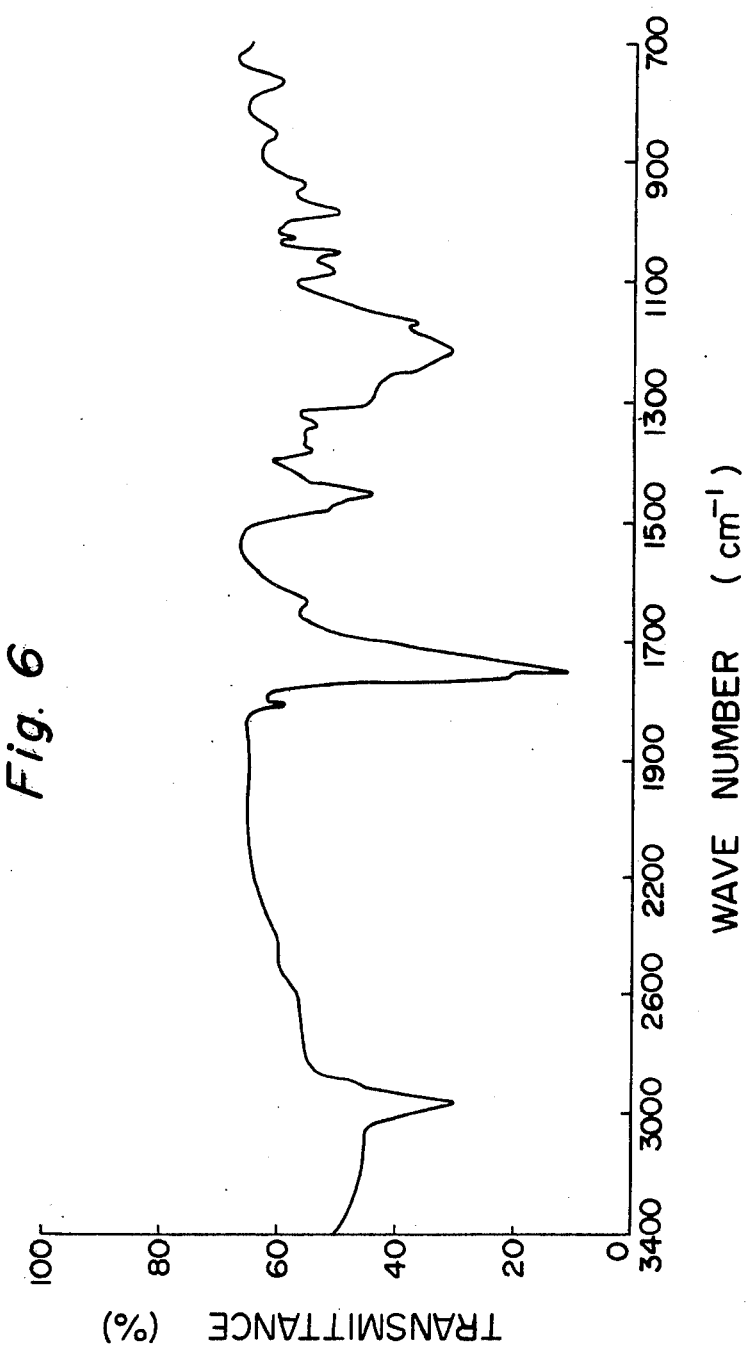

The infrared absorption spectrum of the hydrochloric acid-treated polymer showed strong carboxyl and ester absorptions at 1710 to 1740 cm$^{-1}$. This infrared absorption spectrum is shown in FIG. 6.

The hydrochloric acid-treated polymer was insoluble in n-hexane and toluene, but soluble in pyridine, tetrahydrofuran and dimethyl formamide.

EXAMPLE 69

41.5 g of the same ring-opened copolymer as used in Example 68 was fully pulverized, and placed in a 500 ml. flask. 300 ml. of water and 11.0 g of sodium hydroxide were added, and the polymer was treated with sodium hydroxide in the same way as in Example 60. At the end of the reaction, the reaction mixture was a uniform solution. After the reaction, the sodium hydroxide-treated product was separated from the reaction mixture in the same way as in Example 60, followed by drying. There was obtained 44.0 g of a white powdery polymer having a reduced viscosity (B) of 2.64.

Figure 7:
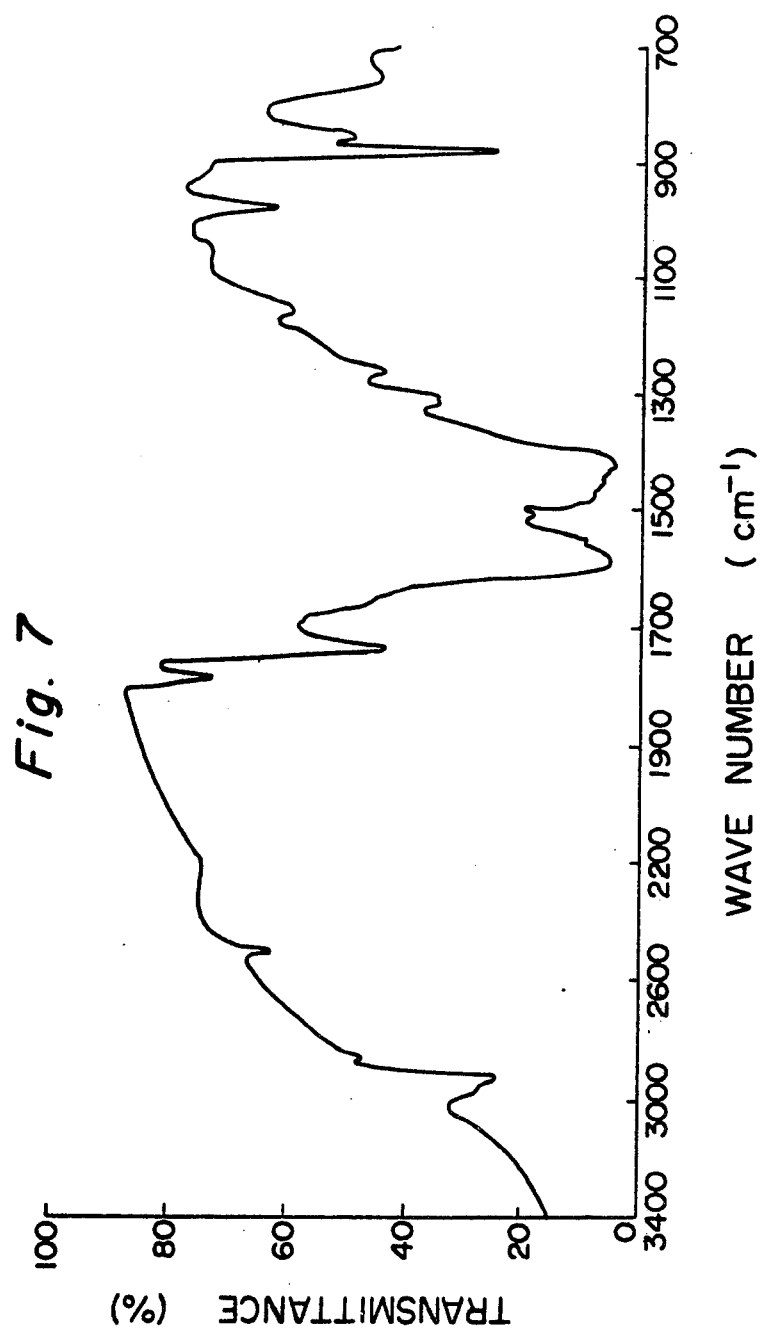

The infrared absorption spectrum of the resulting sodium hydroxide-treated product showed a sharp absorption at 1735 cm$^{-1}$ ascribable to an ester linkage, and a carboxylate absorption at 1600 to 1400 cm$^{-1}$. But the absorption present at 1780 cm$^{-1}$ based on the acid anhydride linkage was observed only slightly. The infrared absorption spectrum of the above alkali-treated polymer is shown in FIG. 7.

EXAMPLE 70

98.5 g of the same sodium hydroxide-treated product as obtained in Example 69 was treated with hydrochloric acid and purified in the same way as in Example 61.

EXAMPLES 71 to 80

A starting copolymer was prepared in the same way as in Example 59 using each of the comonomers shown in Table 8 instead of the 5-cyano-bicyclo[2.2.1]-heptene used in Example 59. The results are shown under column A of Table 8. The copolymer so obtained was hydrolyzed with hydrochloric acid in the same way as in Example 56. The results are shown under column B of Table 8. An infrared spectroscopic analysis of the polymers showed that in each Example, the absorption of acid anhydride at 1700 to 1860 cm$^{-1}$ present before hydrolysis substantially disappeared, and new strong carboxyl absorptions were observed at 1730 and 2610 cm$^{-1}$.

Table 8

| | A | | | | B | | |
|---|---|---|---|---|---|---|---|
| | | | | | | Hydrolyzed polymer | |
| Example | Comonomer | Mole % | Yield | Solubility | Amount of starting copolymer (g) | Yield (g) | $\eta$ sp/c* | Characteristic absorption in IR spectrum at cm$^{-1}$ |
| 71 | N-normalpropyl-3,6-methylene-1,2,3,6-tetrahydro-cis-phthalimide | 50 | 1420g (94.6%) | Soluble in hot DMF | 36.9 | 38.5 | 1.85 | 1780,1770 |
| 72 | Cyclopentene | 50 | 1409g (94.6%) | " | 46.4 | 49.1 | 2.51 | " |
| 73 | 5-Phenylbicyclo[2.2.1]-heptene-2 | 50 | 1471g (98.1%) | Insoluble in organic solvent | 41.8 | 43.1 | — | 1603 |
| 74 | 2-Phenyl-1,4,5,8-dimethano-1,2,3,4,4a,5,8,8a-octahydronaphthalene | 50 | 1442g (96.1%) | " | 50.0 | 51.3 | — | 1603 |
| 75 | 5-Chloromethylbicyclo[2.2.1]-heptene-2 | 50 | 1464g (97.6%) | — | 38.3 | 38.8 | 1.97 | — |
| 76 | 5,8-Diacetoxy-1,4-dihydro-1,4-methano-naphthalene | 50 | 1437g (95.8%) | — | 52.8 | 53.5 | 0.91 | 1760 |
| 77 | 2,3-Dimethoxycarbonyl-bicyclo[2.2.1]-hepta-2,5-diene | 50 | 1422g (94.8%) | — | 46.5 | 48.0 | 0.86 | 1730–1740 |
| 78 | 5-Methoxybicyclo[2.2.1]-heptene-2 | 50 | 1365g (91.0%) | Soluble in hot DMF | 36.5 | 37.7 | 1.29 | — |
| 79 | 1,4,5,8-dimethano-1,2,3,4,4a,5,8,8a-octahydro-naphthalene | 50 | 1416g (94.4%) | — | 40.5 | 42.8 | 1.33 | 1635 |
| 80 | 1,4,5,8-dimethano-1,2,3,4,4a,5,8,8a-octahydro-naphthalene-2,3-dicarboxylic anhydride | 25 | 1419g (94.6%) | — | 44.3 | 47.1 | 1.38 | — |

*in dimethyl formamide, C=0.2 g/dl, at 30° C

There was obtained 77.2 g of a slightly yellow polymer having a reduced viscosity (A) of 2.81.

The infrared absorption spectrum of this hydrochloric acid-treated polymer showed strong absorptions ascribable to carboxyl and ester groups at 1710 to 1740 cm$^{-1}$. This infrared absorption spectrum was much the same as that of the acid-treated product obtained in Example 68.

The resulting hydrochloric acid-modified polymer was insoluble in toluene, but soluble in pyridine, tetrahydrofuran and dimethyl formamide.

EXAMPLES 81 to 90

Figure 8:
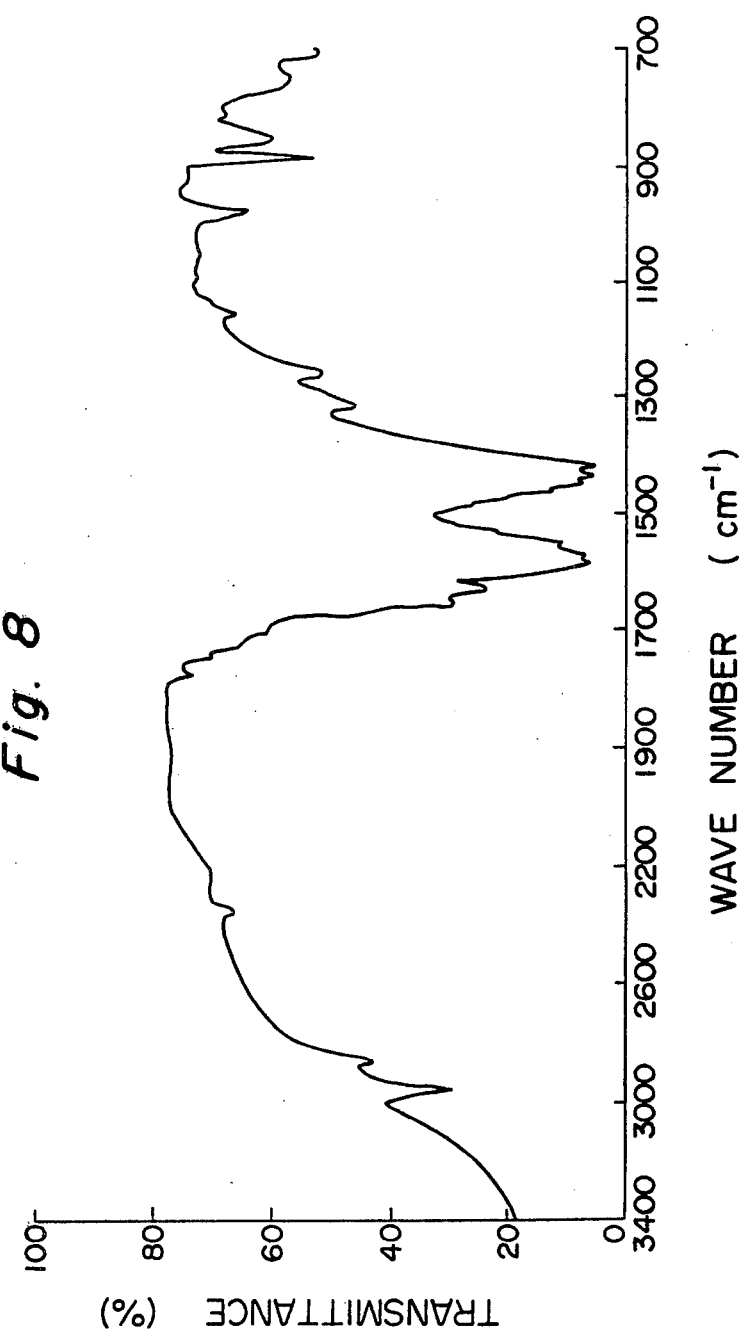

The starting ring-opened copolymers obtained in the same manners as in Examples 71 to 80 were each hydrolyzed in the presence of each of the basic compounds shown in Table 9. The results are shown in Table 9. An infrared absorption spectroscopy of the products show that the acid anhydride absorption at 1700 to 1860 cm$^{-1}$ decreased or disappeared, and a new carboxylate absorption appeared at 1400 to 1600 cm$^{-1}$. The infrared spectra of the polymers obtained in Examples 81 and 82 are shown in FIG. 8 and FIG. 9, respectively.

Table 9

| | Starting polymer | | | | Alkali Hydrolysis | | |
|---|---|---|---|---|---|---|---|
| Example | Prepared same as in Example | Amount (g) | By the same method as in Example | Basic compound | Yield of the hydrolyzed polymer (g) | Reduced viscosity of the hydrolyzed polymer *2) | State of the reaction mixture at the end of the reaction |
| 81 | 71 | 46.1 | 60 | NaOH (23.0g) | 48.9 | 2.05 | Homogeneous |

Table 9-continued

| Example | Starting polymer Prepared same as in Example | Starting polymer Amount (g) | Alkali Hydrolysis By the same method as in Example | Alkali Hydrolysis Basic compound | Alkali Hydrolysis Yield of the hydrolyzed polymer (g) | Alkali Hydrolysis Reduced viscosity of the hydrolyzed polymer *2) | State of the reaction mixture at the end of the reaction |
|---|---|---|---|---|---|---|---|
| 82 | 72 | 29.0 | 60 | NaOH | 29.9 | 2.64 | Homogeneous |
| 83 | 73 | 41.8 | 60 | NaOH | 42.9 | (insoluble) | Heterogeneous |
| 84 | 74 | 50.0 | 60 *1) | NaOH | 51.9 | (insoluble) | Heterogeneous |
| 85 | 75 | 38.3 | 60 | NaOH | 40.1 | 2.16 | Homogeneous |
| 86 | 76 | 52.8 | 60 *1) | $Na_2CO_3$ (31.8g) | 54.1 | 0.97 | Homogeneous |
| 87 | 77 | 46.5 | 86 | $Na_2CO_3$ (31.8g) | 49.0 | 0.91 | Homogeneous |
| 88 | 78 | 36.0 | 60 | NaOH | 36.9 | 1.41 | Homogeneous |
| 89 | 79 | 40.5 | 60 *1) | NaOH | 43.7 | 1.50 | Homogeneous |
| 90 | 80 | 88.6 | 60 | NaOH | 89.2 | 1.57 | Homogeneous |

*1) Reaction temperature, 80° C.
*2) Measured in a 1% by weight aqueous solution of $Na_2CO_3$ or in water at 30° C. in a concentration of 0.2 g/dl.

EXAMPLES 91 to 100

Each of the same alkali-hydrolyzed polymers as obtained in Examples 81 to 90 was treated with hydrochloric acid to form carboxylic acid-type copolymer products. The results are shown in Table 10. Infrared spectroscopic analysis showed that there was a marked difference in spectrum between the alkali-hydrolyzed polymers and the hydrochloric acid-treated products. The infrared absorption spectrum of the hydrochloric acid-treated products showed a strong carboxyl absorption at 1730 and 2160 cm$^{-1}$, while the carboxylate absorption present in the alkali-hydrolyzed polymers at 1400 to 1600 cm$^{-1}$ disappeared.

Table 10

| Example | Starting alkali-treated polymers Prepared same as in Example | Starting alkali-treated polymers Amount (g) | Hydrochloric acid treatment Acid treatment and post-treatment performed same as in Example | Hydrochloric acid treatment Yield of the acid-treated polymer (g) | Hydrochloric acid treatment Reduced viscosity of the acid-treated polymer *1) |
|---|---|---|---|---|---|
| 91 | 81 | 100.0 | 61 | 77.4 | 2.15 |
| 92 | 82 | 147.0 | 61 | 108.0 | 2.60 |
| 93 | 83 | 198.0 | 23 | 164.5 | (insoluble) |
| 94 | 84 | 231.0 | 23 | 199.0 | (insoluble) |
| 95 | 85 | 184.3 | 23 | 150.9 | 2.18 |
| 96 | 86 | 242.0 | 23 | 206.6 | 0.86 |
| 97 | 87 | 217.0 | 23 | 180.6 | 0.85 |
| 98 | 88 | 175.0 | 23 | 141.9 | 1.28 |
| 99 | 89 | 191.0 | 23 | 156.5 | 1.59 |
| 100 | 90 | 239.0 | 23 | 170.4 | 1.47 |

*1) Measured in dimethyl formamide, C=0.2 g/dl., at 30° C.

EXAMPLE 101

The same polymerization as in Example 1 was performed except that 1 mole %, based on the monomer, of n-hexane-1 as a molecular-weight controlling agent. The polymer was separated and dried in the same way as in Example 1 to afford 1407 g of a light yellowish brown polymer. The polymerization conversion was 93.8%.

The infrared absorption spectrum of the resulting polymer was very similar to that of the polymer obtained in Example 1.

41.0 g of the polymer obtained above was fully pulverized, and treated with hydrochloric acid, and then post-treated (purified) in the same way as in Example 1. There was obtained 41.9 g of a white powdery polymer having a reduced viscosity (A) of 0.54.

The infrared absorption spectrum of the hydrochloric acid-treated polymer obtained was very similar to that of the hydrochloric acid-treated product obtained in Example 1.

EXAMPLE 102

82.0 g of the same starting ring-opened polymer as used in Example 101 was fully pulverized, and hydrolyzed using an aqueous solution of sodium hydroxide in the same way as in Example 12. At the end of the reaction, the reaction mixture was a uniform solution. After the reaction, the reaction mixture was post-treated in the same way as in Example 12. There was obtained 98.3 g of a white powdery polymer having a reduced viscosity in water of 0.59. The solubility of the alkali-hydrolyzed polymer was the same as in Example 9.

EXAMPLE 103

The same sodium hydroxide-treated polymer as obtained in Example 102 was treated with hydrochloric acid, and purified in the same way as in Example 23 with the exception that the operation was performed on a two-fold scale. There was obtained 159.3 g of a white powdery polymer (hydrochloric acid-modified product) having a reduced viscosity (A) of 0.57.

The infrared absorption spectrum of the hydrochloric acid-treated product was very similar to that of the hydrochloric acid-modified product obtained in Example 1.

EXAMPLE 104

The same polymerization as in Example 1 was performed except that 20 mole %, based on the monomer, of n-hexane-1 was used as a molecular weight controlling agent, the polymerization temperature was changed to 60° C., and the polymerization time was changed to 20 hours. After the polymerization, the polymer was separated and dried in the same way in Example 101. There was obtained 1352 g of a light yellowish brown polymer. The polymerization conversion was 90.1 %.

The infrared absorption spectrum of the polymer so obtained was very similar to that of the ring-opened polymer obtained in Example 1.

41.0 g of the polymer so obtained was fully pulverized, and treated with hydrochloric acid and purified in the same way as in Example 1. There was obtained 35.8 g of a white powdery polymer having a reduced viscosity (A) of 0.09.

The infrared absorption spectrum of the hydrochloric acid-treated product so obtained was very similar to that of the hydrochloric acid-treated product obtained in Example 1.

EXAMPLE 105

82.0 g of the same starting ring-opened polymer as used in Example 104 was fully pulverized, and treated with an aqueous solution of sodium hydroxide in the same way as in Example 12. At the end of the reaction, the reaction mixture was a uniform solution. After the reaction, the reaction mixture was post-treated in the same way as in Example 12 to afford 77.2 g of a white powdery polymer having a reduced viscosity in water of 0.11. The infrared absorption spectrum of this polymer was very similar to that of the alkali-treated polymer obtained in Example 9.

EXAMPLE 106

226.0 g of the same sodium hydroxide-treated polymer as obtained in Example 105 was reacted with hydrochloric acid and then purified in the same way as in Example 23 (with the exception that the operation was performed on a twofold scale). There was obtained 138.8 g of a white powdery polymer having a reduced viscosity (A) of 0.09.

The infrared absorption spectrum of the resulting polymer was very similar to that of the hydrochloric acid-modified product obtained in Example 1.

EXAMPLES 107 to 114

The same acid treatment as in Example 64 was performed except that the amount of hydrochloric acid (1N) was changed as shown in Table 11 and the operation was performed on a 1/10 scale. The resulting product was purified in the same way as in Example 64. The amounts of hydrochloric acid used in the acid treatment and the yields of the polymers obtained by the acid treatment are shown in Table 11.

Table 11

| Example | Amount of hydrochloric acid (1N) (ml) | Amount of the acid-modified polymer yielded (g) |
|---|---|---|
| 107 | 30.0 *1) | 12.8 |
| 108 | 28.5 | 12.8 |
| 109 | 27.0 | 12.7 |
| 110 | 25.5 | 12.8 |
| 111 | 24.0 | 12.9 |
| 112 | 20.0 | 13.0 |
| 113 | 15.0 | 12.9 |
| 114 | 10.0 | 13.3 |

*1) The amount of hydrochloric acid was the theoretical amount required to convert —COONa of the ring-opened polymer completely to —COOH.

The acid-modified polymer obtained in Example 107 was insoluble in dimethyl formamide and methyl alcohol (it was swollen with dimethyl formamide). The acid-modified polymers obtained in Examples 108 to 114 were all insoluble in dimethyl formamide, methyl alcohol and other ordinary organic solvents.

An infrared spectroscopic analysis of these acid-modified polymers was performed. The infrared absorption spectrum of the acid-modified polymer obtained in Example 107 was much the same as that of the acid-modified product obtained in Example 64. On the other hand, the infrared absorption spectra to the acid-modified polymers obtained in Examples 108 to 114 differ from that of the acid-modified polymer obtained in Example 64 in that these spectra showed a carboxylate absorption at 1400 to 1600 cm$^{-1}$. There was a tendency that the intensity of the carboxylate absorption increases with decreasing amount of hydrochloric acid.

EXAMPLES 115 to 118

16.40 g of the same ring-opened homopolymer of 3,6-methylene-1,2,3,6-tetrahydro-cis-phthalic anhydride as used in Example 1 was placed in a 500 ml. flask, and 160 cc of water was added. The polymer was then treated with sodium hydroxide in the varying amounts shown in Table 12 in the same way as in Example 9. Then, the alkali-treated polymer was treated was hydrochloric acid in the varying amounts shown in Table 12 in the same way as in Example 23. The results are shown in Table 12.

Table 12

| Example | Amount of sodium hydroxide (g) | Amount of hydrochloric acid (g) | Yield of the acid-modified polymer (g) | Reduced viscosity of the acid-modified polymer *3) |
|---|---|---|---|---|
| 115 | 0.4 | 11.0 *1) | 17.2 | 1.35 |
| 116 | 2.0 | 4.6 *2) | 16.7 | 1.35 |
| 117 | 4.0 | 9.2 *2) | 17.3 | 1.34 |
| 118 | 8.0 | 18.4 *2) | 17.0 | 1.35 |

*1) 1N hydrochloric acid
*2) Conc. hydrochloric acid (12N)
*3) Solvent A

APPLICATION EXAMPLE 1

Each of the acid-modified polymers obtained in Examples 23, 61, 64, 67, 108 and 109 (to be referred to acid-modified polymers I, II, III, IV, V and VI respectively) was pressed at 70 Kg/cm$^2$ for 10 minutes using a press kept at 220° to 300° C. The impact strength (Izod with notch; ASTM D-256–56), tensile strength (ASTM D-638–58T), and elongation (ASTM D-638–58T) of each of the press plates obtained were measured, and the results are shown in Table 13.

Table 13

| Acid-modified polymer | Impact strength (Kg.cm/cm) | Tensile strength (Kg/cm$^2$) | Elongation (%) |
|---|---|---|---|
| I | 1.46 | 670 | 5 |
| II | 5.49 | 590 | 45 |
| III | 8.51 | 560 | 70 |
| IV | 11.6 | 570 | 110 |
| V | 57.3 | 560 | 180 |
| VI | 54.4 | 550 | 180 |

APPLICATION EXAMPLE 2

1.0 g of the alkali-treated polymer obtained was dissolved in 1 liter of pure water. The solution will be referred to as "solution A". 40 g of aluminum sulfate hexadecahydrate was dissolved in 9.65 liters of water, and when the solution became uniform, 450 ml. of a 1N aqueous solution of sodium hydroxide was added with stirring. This resulted in the precipitation of jelly-like aluminum hydroxide. The pH of this solution was measured, and found to be 7. This solution will be referred to as "solution B".

Solution B was stirred so that the aluminum hydroxide became uniform, and then transferred into a 1-liter measuring cylinder. Solution A was added in the amount shown in Table 14 to the solution B. The mixture was allowed to stand, and the speed at which aluminum hydroxide settled was measured. The results are shown in Table 14. The speed of settling was evaluated by the speed of increase in the amount of the supernatant liquid when the volume of the supernatant liquid reached 50 cc (the aluminum hydroxide settled at substantial equal speeds.

Table 14

| Run No. | Amount of solution A (ml) | Amount of the polymer (ppm) *1) | Speed of settling (ml/min.) |
|---|---|---|---|
| 1 | 4 | 5 | 9.6 |
| 2 | 8 | 10 | 6.4 |
| 3 | 16 | 20 | 12.1 |
| 4 | 40 | 50 | 23.0 |
| 5 | 80 | 100 | 40.8 |
| 6 | 0 | 0 | 3.8 |

*1) Amount of the sodium hydroxide-treated ring-opened polymer

It is clear from the above experiment that the alkali-treated products obtained by the process of this invention are useful as polymeric flocculating agents.

APPLICATION EXAMPLE 3

Each of the alkali-treated polymers obtained in Examples 63 and 66 (to be referred to as "polymer I" and "polymer II", respectively) was mixed with 0.5% by weight of bis(2-hydroxy-3-tert.butyl-5-methylphenyl) methane as a stablizer.

A ring-opened homopolymer of 5-cyano-bicyclo [2.2.1]-heptene-2 was prepared in the same way as in Example 62 except that 3,6-methylene-1,2,3,6-tetrahydro-cis-phthalic anhydride as a comonomer was not used. (This polymer will be referred to as "PN-C".) PN-C was mixed with 0.5% by weight of the above stabilizer.

Each of the stabilizer-containing polymer I, polymer II and PN-C, and a commercially available vinyl chloride resin (KUREHA S901, trademark for a product of Kureha Kagaku Kogyo Kabushiki Kaisha; to be referred to as "PVC") and a commercially available propylene resin (SHOWALLOMER, trademark for a product of Showa Yuka Kabushiki Kaisha; to be referred to as "PP") was press-formed to form press plates. The Izod impact strength (with notch ASTM D-256–56), tensile strength at breakage (ASTM D-638–58T), elongation (the same method as used to measure the tensile strength), and Rockwell hardness R (ASTM D-785–51) of the pressed plates were measured. The results are shown in Table 15.

Table 15

| Polymer | Impact strength (Kg.cm/cm) | Tensile strength (Kg/cm²) | Elongation (%) | Rockwell hardness R |
|---|---|---|---|---|
| Polymer I | 72.4 | 435 | 163 | — |
| Polymer II | 85.2 | 513 | 190 | 124 |
| PN-C | 6.9 | 562 | 108 | 121 |
| PP | 1.7 | 354 | 950 | 92 |
| PVC | 3.2 | 337 | 240 | 114 |

The results shown in Table 15 demonstrate that the alkali-treated polymers obtained by the process of this invention have superior impact strength and hardness to the commercially available propylene resin and vinyl chloride resin, and higher tensile strength than the propylene resin. Furthermore, the alkali-treated polymers have far higher impact strength than PN-C.

What we claim is:

1. A homopolymer or copolymer comprising recurring units of the following formula

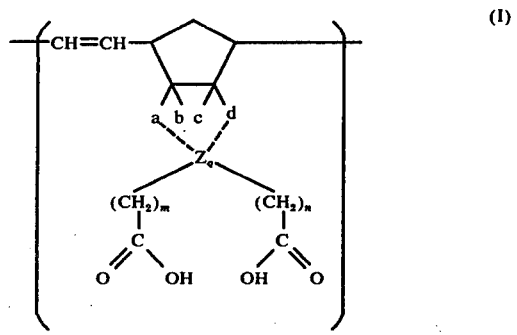

or

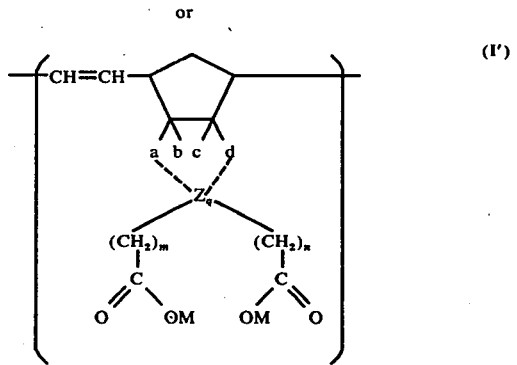

wherein Z is bonded to a carbon of a five-membered ring by any two of bonds $a$ to $d$, the remaining two bonds being filled by $R^1$ and $R^2$, and Z represents

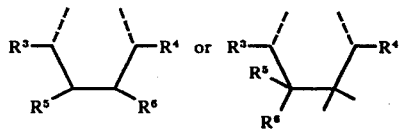

$R^1$ to $R^6$, independently from each other, represent a hydrogen atom or an alkyl group containing 1 to 6 carbon atoms; and endomethylene linkage can exist between the carbon atom to which $R^3$ is attached and the carbon atom to which $R^4$ is attached; $q$ is 0 or 1; $m$ and $n$, independently from each other, are 0, 1 or 2.

and M represents a hydrogen atom or a positive ion selected from the group consisting of alkali metals, alkaline earth metals and quaternary ammonium, with the proviso that at least 1 mole % of the existing M is the above ion other than hydrogen; the degree of polymerization of said homopolymer or copolymer being about 10 to 10,000; and said copolymer being composed of more than 1 mole % of the unit of the formula (I) or (I') and less than 99 mole % of one biradical unit selected from the following groups:

a. units of the following formula

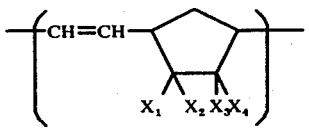

wherein $X_1$, $X_2$, $X_3$ and $X_4$, independently from each other, represent a hydrogen atom, a hydrocarbon radical containing 1 to 20 carbon atoms, polar group selected from the group consisting of cyano, ester, ether, halogen, amido and imido, or a hydrocarbon radical containing 1 to 20 carbon atoms and substituted by one said polar group, with the proviso that at least one of $X_1$, $X_2$, $X_3$ and $X_4$ is the polar group, the hydrocarbon substituted by the polar group, or an aryl radical group containing 6 to 20 carbon atoms;

b. units of the following formula

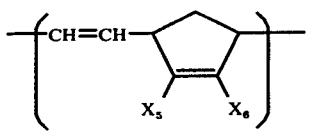

wherein $X_5$ and $X_6$, independently from each other, represent a hydrogen atom, a hydrocarbon radical containing 1 to 10 carbon atoms, an ester radical, or a hydrocarbon radical containing 1 to 10 carbon atoms substituted by an ester radical, and at least one of $X_5$ and $X_6$ is the ester radical or the ester-substituted hydrocarbon radical containing 1 to 10 carbon atoms;

c. units of the following formula

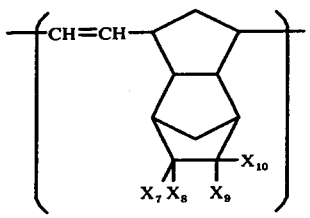

wherein $X_7$, $X_8$, $X_9$ and $X_{10}$, independently from each other, represent a hydrocarbon radical containing 1 to 20 carbon atoms, and at least one of $X_7$, $X_8$, $X_9$ and $X_{10}$ is an aryl or alkaryl radical containing 6 to 20 carbon atoms;

d. units of the following formula

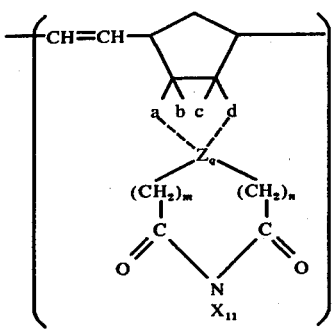

wherein $X_{11}$ represents a hydrocarbon radical containing 1 to 10 carbon atoms or an ester group-containing radical containing 3 to 21 carbon atoms, and Z, q, m and n are the same as defined above;

e. units of the following formula

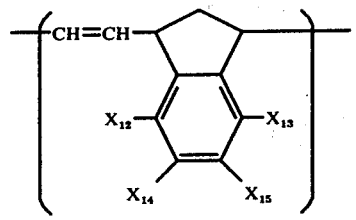

wherein $X_{12}$, $X_{13}$, $X_{14}$ and $X_{15}$, independently from each other, represent a hydrogen atom, a hydrocarbon radical containing 1 to 10 carbon atoms, a polar group selected from the group consisting of cyano, ester and halogen, or a hydrocarbon radical containing 1 to 10 carbon atoms and substituted by one said polar group;

e. units of the following formula

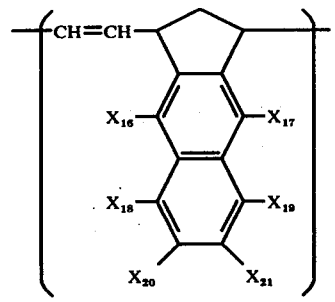

wherein $X_{16}$, $X_{17}$, $X_{18}$, $X_{19}$, $X_{20}$ and $X_{21}$ are the same as $X_{12}$, $X_{13}$, $X_{14}$ and $X_{15}$;

g. units of a monoolefinic hydrocarbon containing 4 to 20 carbon atoms; and h. units of a non-conjugated diene group containing 6 to 20 carbon atoms.

2. The homopolymer or copolymer of claim 1 which has a reduced viscosity, measured in dimethyl formamide at 30° C. in a concentration of 0.2 g/l, of 0.05 to 20.

3. The copolymer of claim 1 which is gel-like.

4. The copolymer of claim 1 which is water-soluble and in which the proportion of the recurring units of formula (I') is at least 40 mole %, and the product of the proportion in mole % of the recurring units of formula (I') multiplied by the proportion in mole % of the positive ion M present in said recurring units is at least 50.

5. The homopolymer or copolymer of claim 1 which has a reduced viscosity, measured in a 1% by weight aqueous solution of sodium carbonate at 30° C. in a concentration of 0.2 g/dl of 0.05 to 25.

6. The homopolymer of claim 1 which comprises recurring units of the following formula

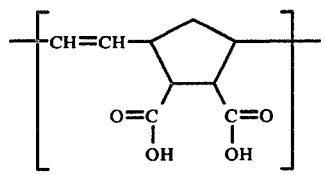

and which has a reduced viscosity, measured in dimethyl formamide at 30° C. in a concentration of 0.2 g/dl, of 0.05 to 20.

7. The homopolymer of claim 1 which comprises recurring units of the following formula

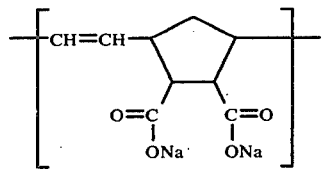

and which has a reduced viscosity, measured in a 0.2% by weight aqueous solution of sodium carbonate at 30° C. in a concentration of 0.29 g/dl, of 0.05 to 25.

8. The polymer of claim 1 which comprises recurring units of the following formula

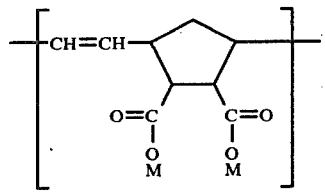

wherein M represents a hydrogen atom or a positive ion selected from the group consisting of $Li^+$, $Na^+$, $K^+$,

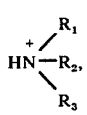

in which $R_1$, $R_2$ and $R_3$ are identical or different, hydrocarbon radicals having not more than 10 carbon atoms in total, with the proviso that at least 1 mole % of the existing M is the above ion other than hydrogen.

9. The polymer of claim 8 in which M represents H and Na.

10. The copolymer of claim 1 selected from the group consisting of

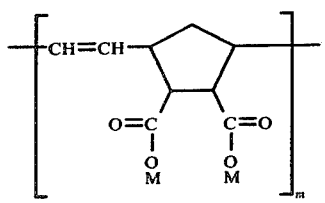

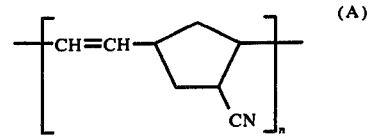

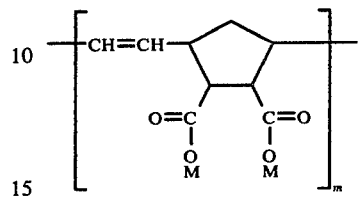

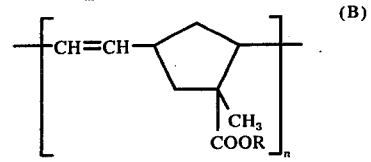

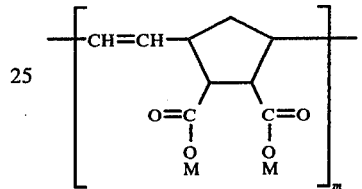

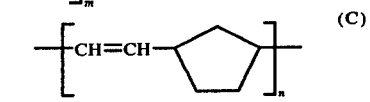

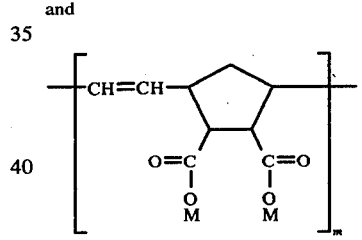

and

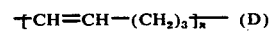

wherein $m$ represents a mole % of more than 1 and less than 100, and $n$ represents a mole % of less than 99 and more than 0, and R is a hydrocarbon radical containing 1 to 20 carbon atoms.

11. Copolymers (A), (B), (C) and (D) of claim 10 which are soluble in dimethyl formamide and have a reduced viscosity, measured in the above solvent at 30° C. in a concentration of 0.2 g/dl, of 0.05 to 20.

12. Copolymers (A), (B), (C) and (D) of claim 10 which are insoluble in dimethyl formamide, but are soluble in a 1% by weight sodium carbonate aqueous solution, and have a reduced viscosity, measured in the above aqueous solution at 30° C in a concentration of 0.2 g/dl, of 0.05 to 25.

13. Copolymers (A), (B), (C) and (D) of claim 10 which are insoluble in each of dimethyl pormamide and a 1% by weight $Na_2CO_3$ aqueous solution, and have a softening temperature below 200° C, and furthermore have characteristic absorption in infrared spectra at 2610 and 1730 $cm^{-1}$ attributable to carboxyl and 1600 – 1400 $cm^{-1}$ attributable to carboxylate.

* * * * *